US012282520B2

(12) United States Patent
Mallah et al.

(10) Patent No.: US 12,282,520 B2
(45) Date of Patent: *Apr. 22, 2025

(54) SYSTEMS AND METHODS FOR SEMANTIC KEYWORD ANALYSIS

(71) Applicant: MarketMuse, Inc., Boston, MA (US)

(72) Inventors: Richard Israel Mallah, Boston, MA (US); Akos Lajos Balogh, Boston, MA (US)

(73) Assignee: MarketMuse, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,132

(22) Filed: Aug. 23, 2023

(65) Prior Publication Data

US 2023/0394101 A1 Dec. 7, 2023

Related U.S. Application Data

(63) Continuation of application No. 17/188,600, filed on Mar. 1, 2021, now Pat. No. 11,768,901, which is a
(Continued)

(51) Int. Cl.
*G06F 16/00* (2019.01)
*G06F 16/2457* (2019.01)
(Continued)

(52) U.S. Cl.
CPC .... *G06F 16/9538* (2019.01); *G06F 16/24575* (2019.01); *G06F 16/24578* (2019.01);
(Continued)

(58) Field of Classification Search
CPC .......... G06F 16/9538; G06F 16/24575; G06F 16/24578; G06F 16/285; G06F 16/90324;
(Continued)

(56) References Cited

U.S. PATENT DOCUMENTS 8,676,798 B1 3/2014 Datta et al.
10,162,882 B2 12/2018 Franceschini et al.
(Continued)

OTHER PUBLICATIONS

Non-Final Office Action received for U.S. Appl. No. 17/188,600 dated Jan. 5, 2023, 30 pages.
(Continued)

*Primary Examiner* — Noosha Arjomandi
(74) *Attorney, Agent, or Firm* — Barnes & Thornburg LLP

(57) ABSTRACT

In various embodiments, a method for generating from one or more keywords a list of related topics for organic search includes receiving, by a topic tool, an input of one or more keywords for which to generate a list of related topics. The method may further include acquiring, by a crawler, content from a plurality of different web content sources via one or more networks. The method may also include applying, by the topic tool, to the acquired content an ensemble of one or more key phrase extraction algorithms, one or more graph analyses algorithms and one or more natural language processing algorithms to identify a set of semantically relevant topics scored by relevance. The method may also include generating, by the topic tool, from the set of semantically relevant topics, a knowledge graph of related topics for the input of the one or more keywords. The method may further include outputting, by the topic tool based at least partially on the knowledge graph, an enumerated list of topics ranked by at least a relevance score.

20 Claims, 15 Drawing Sheets

Related U.S. Application Data continuation of application No. 16/523,267, filed on Jul. 26, 2019, now abandoned, which is a continuation of application No. 14/928,210, filed on Oct. 30, 2015, now Pat. No. 10,409,875.

(60) Provisional application No. 62/073,560, filed on Oct. 31, 2014.

(51) Int. Cl.
*G06F 16/28* (2019.01)
*G06F 16/9032* (2019.01)
*G06F 16/951* (2019.01)
*G06F 16/9535* (2019.01)
*G06F 16/9538* (2019.01)
*G06Q 30/0251* (2023.01)

(52) U.S. Cl.
CPC ...... *G06F 16/285* (2019.01); *G06F 16/90324* (2019.01); *G06F 16/90332* (2019.01); *G06F 16/951* (2019.01); *G06F 16/9535* (2019.01); *G06Q 30/0256* (2013.01)

(58) Field of Classification Search
CPC ............ G06F 16/90332; G06F 16/951; G06F 16/9535
See application file for complete search history.

(56) References Cited

U.S. PATENT DOCUMENTS

| | | | |
|---|---|---|---|
| 11,061,913 B2* | 7/2021 | Eifert | G16H 40/20 |
| 11,074,262 B2* | 7/2021 | Eifert | G06V 30/416 |
| 11,132,988 B1* | 9/2021 | Steedman Henderson | G10L 15/22 |
| 11,270,061 B2* | 3/2022 | Herzig | G06N 20/00 |
| 11,379,540 B2* | 7/2022 | James | G06F 16/35 |
| 11,574,522 B1* | 2/2023 | Mendell | G06Q 50/01 |
| 11,615,251 B1* | 3/2023 | Schilling | G06F 11/3438 707/758 |
| 2002/0129014 A1 | 9/2002 | Kim et al. | |
| 2007/0174340 A1 | 7/2007 | Gross | |
| 2009/0063468 A1* | 3/2009 | Berg | G06F 16/951 707/999.005 |
| 2010/0030648 A1 | 2/2010 | Manolescu et al. | |
| 2011/0213655 A1* | 9/2011 | Henkin | G06Q 30/00 707/E17.061 |
| 2011/0288931 A1 | 11/2011 | Kuhn et al. | |
| 2012/0226713 A1 | 9/2012 | Park et al. | |
| 2016/0125087 A1* | 5/2016 | Mallah | G06F 16/90332 705/14.54 |
| 2016/0232162 A1* | 8/2016 | Dzumla | G06F 16/9535 |
| 2017/0235848 A1 | 8/2017 | Van Dusen et al. | |
| 2018/0366013 A1 | 12/2018 | Arvindam | |
| 2020/0380043 A1* | 12/2020 | Miyazawa | G06F 16/90332 |
| 2021/0065569 A1* | 3/2021 | Arvindam | G06F 40/30 |
| 2021/0182352 A1* | 6/2021 | Mallah | G06F 16/9538 |
| 2021/0294974 A1* | 9/2021 | Gao | G06F 40/166 |
| 2022/0415290 A1* | 12/2022 | Jeffrey | H04M 1/72454 |

OTHER PUBLICATIONS

Final Office Action received for U.S. Appl. No. 14/928,210 dated Oct. 25, 2018, 45 pages.

International Preliminary Report on Patentability received for PCT Application Serial No. PCT/US2015/058289 dated May 11, 2017, 7 pages.

Notice of Allowance received for U.S. Appl. No. 14/928,210 dated May 1, 2019, 39 pages.

Non-Final Office Action received for U.S. Appl. No. 14/928,210 dated May 3, 2018, 38 pages.

International Search Report and Written Opinion received for PCT Application Serial No. PCT/US2015/058289 dated Feb. 2, 2016, 8 pages.

International Search Report and Written Opinion received for PCT Application Serial No. PCT/US2015/058285 dated Feb. 1, 2016, 9 pages.

Kim et al. "Retrieving and Ranking Methods for Finding Match Candidates", International Conference on Complex, Intelligent, and Software Intensive Systems, 2011, 5 pages.

Non-Final Office Action received for U.S. Appl. No. 14/928,220 dated Feb. 25, 2019, 85 pages.

Notice of Allowance received for U.S. Appl. No. 14/928,220 dated Jul. 25, 2019, 74 pages.

Geadas et al. "Ensemble Learning for Keyword Extraction from Event Descriptions", International Joint Conference on Neural Networks (IJCNN), Jul. 6-11, 2014, 8 pages.

Zhu et al., "Combination of Unsupervised Keyphrase Extraction Algorithms", International Conference on Asian Language Processing, 2013, 4 pages.

Non final office action received for U.S. Appl. No. 16/523,267 dated Dec. 7, 2020, 73 Pages.

Notice of Allowance received for U.S. Appl. No. 17/188,600 dated May 22, 2023, 50 pages.

* cited by examiner

| Topic | Relevance |
|---|---|
| search engine | 86.30% |
| search engines | 82.51% |
| keyword tool | 75.12% |
| keyword research tools | 69.47% |
| market samurai | 66.92% |
| google adwords | 65.27% |
| keyword planner | 62.96% |
| keyword research tool | 62.86% |
| google keyword | 60.97% |
| search engine optimization | 60.42% |
| keyword analysis | 59.35% |
| keyword tools | 57.77% |
| list of keywords | 56.52% |
| keyword research pro | 55.05% |
| long tail keywords | 54.86% |
| bing ads | 54.73% |
| adwords keyword | 54.13% |
| adwords keyword tool | 52.83% |
| seo strategy | 52.65% |
| google keyword tool | 51.81% |
| keyword search | 49.22% |
| keyword list | 48.41% |
| seo campaign | 47.79% |
| tailored suits | 47.18% |
| blog post | 46.78% |

| Topic | Relevance |
|---|---|
| paid search | 46.48% |
| google adwords keyword | 46.20% |
| internet marketing | 45.48% |
| google search | 45.38% |
| youtube search | 44.89% |
| keyword suggestion | 44.33% |
| search term | 43.79% |
| free seo | 43.70% |
| search engine rankings | 43.57% |
| good seo | 43.54% |
| seo tools | 43.49% |
| site seo | 43.29% |
| seo services | 43.28% |
| seo tips | 43.11% |
| organic search | 43.04% |
| google analytics | 41.78% |
| pay per click | 40.15% |
| keyword analysis tool | 40.05% |
| keyword discovery | 40.02% |
| pool company | 39.16% |
| screened porches | 38.58% |
| long tail keyword | 38.42% |
| targeted traffic | 37.66% |
| mobile devices | 37.24% |
| google adwords keyword tool | 37.02% |

SYSTEMS AND METHODS FOR SEMANTIC KEYWORD ANALYSIS

CROSS-REFERENCES TO RELATED APPLICATIONS

This application is a continuation of U.S. application Ser. No. 16/523,267 titled "SYSTEMS AND METHODS FOR SEMANTIC KEYWORD ANALYSIS" and filed on Jul. 26, 2019 which is a continuation of U.S. application Ser. No. 14/928,210 titled "SYSTEMS AND METHODS FOR SEMANTIC KEYWORD ANALYSIS" and filed on Oct. 30, 2015, (now U.S. Pat. No. 10,409,875) which claims priority to and the benefit of U.S. Provisional Application No. 62/073,560, titled "SYSTEMS AND METHODS FOR SEMANTIC KEYWORD ANALYSIS FOR ORGANIC SEARCH" and filed on Oct. 31, 2014, which is incorporated by reference herein in its entirety for all purposes.

FIELD OF THE DISCLOSURE

This disclosure generally relates to systems and methods for keyword research and analysis, and in particular, to keyword research and analysis with respect to organic search engine optimization.

BACKGROUND OF THE DISCLOSURE

In efforts to increase organic visibility and traffic of web pages (e.g., blogs, news sites, etc.), owners of web pages may engage in search engine optimization (SEO). Search engine optimization entails considerations of how search engines work, what people search for, how people search (e.g., what terms people use to search for various topics), and the like. As an example of one method of SEO, owners of websites may attempt to manually research search terms typically related to the topics of their websites, and attempt to incorporate those terms into their content. However, such a method may be cumbersome, time-consuming, and provide minimal beneficial effect on SEO.

BRIEF SUMMARY OF THE DISCLOSURE

The present solution provides a new tool for keyword research and analysis for search engine optimization. Various embodiments of the tool provide an efficient and user-friendly mechanism for identifying related topics that may be incorporated into a user's website in an effort to increase organic traffic.

In various embodiments, a method for generating from one or more keywords a list of related topics for organic search includes receiving, by a topic tool, an input of one or more keywords for which to generate a list of related topics. The method may further include acquiring, by a crawler, content from a plurality of different web content sources via one or more networks. The method may also include applying, by the topic tool, to the acquired content an ensemble of one or more key phrase extraction algorithms, one or more graph analyses algorithms and one or more natural language processing algorithms to identify a set of semantically relevant topics scored by relevance. The method may also include generating, by the topic tool, from the set of semantically relevant topics, a knowledge graph of related topics for the input of the one or more keywords. The method may further include outputting, by the topic tool based at least partially on the knowledge graph, an enumerated list of topics ranked by at least a relevance score.

In some embodiments, the method further includes receiving, by the topic tool, the input of one or more keywords from a topic inventory tool, the topic inventory tool generating the input keyword from analyses of content from an identified web site.

In some embodiments, the method further includes acquiring content, by a crawler, from the plurality of different web content sources including web sites, news articles, blog posts and keyword data.

According to some embodiments, the method further includes cleansing and normalizing the acquired content.

In some embodiments, the one or more key phrase extraction algorithms include a Bayesian statistical ensemble.

In some embodiments, the method further includes performing a plurality of term ranking functions including one or more of a core phrase term ranking function, a tail phrase term ranking function, a hyperdictionary graph traversal algorithm and/or a semantic knowledgebase path traversal score.

In some embodiments, the method further includes applying a weight to each of the more algorithms of the ensemble to generate the relevance score for the set of semantic relevance scored phrases.

In some embodiments, the method further includes outputting the enumerated list of topics ranked by a measure of frequency including one of more of frequency in page body, frequency in title and/or number of pages where the topics occur.

In some embodiments, the method further includes outputting the enumerated list of topics ranked by at least one of an attractiveness score, a volume score and a competition score.

In some embodiments, the method further includes outputting the enumerated list of topics ranked by an estimated equivalent value associated with paid advertising.

According to various embodiments, a system for generating from one or more keywords a list of related topics for organic search includes a crawler configured to acquire content from a plurality of different web content sources via one or more networks. The system further includes a topic tool configured to receive an input of one or more keywords for which to generate a list of related topics. The topic tool may be further configured to receive an input of one or more keywords for which to generate a list of related topics and to apply to the acquired content an ensemble of one or more key phrase extraction algorithms, one or more graph analyses algorithms and one or more natural language processing algorithms to identify a set of semantically relevant topics scored by relevance. The topic tool may be configured to generate from the set of semantically relevant topics, a knowledge graph of related topics for the input of the one or more keywords. The topic tool may be configured to output based at least partially on the knowledge graph and an enumerated list of topics ranked by at least a relevance score.

In some embodiments, the system further includes a topic inventory tool configured to generate the input of one or more keywords from analyses of content from an identified web site.

In some embodiments, the key phrase extraction algorithms include a Bayesian statistical ensemble.

In some embodiments, the ensemble is further configured to perform a plurality of term ranking functions including one or more of a core phrase term ranking function, a tail phrase term ranking function, a hyperdictionary graph traversal algorithm and/or a semantic knowledgebase path traversal score.

In some embodiments, the topic tool is configured to output the enumerated list of topics ranked by one or more of measuring frequency, an attractiveness score, volume score and/or a competition score.

According to various embodiments, a system including a content audit tool configured to execute on a processer to receive a focus one or more keywords for a website, the website crawled by a crawler for content. The content audit tool may be configured to apply to the content an ensemble of one or more key phrase extraction algorithms, one or more graph analyses algorithms and one or more natural language processing algorithms to identify a set of semantic relevant topics scored by relevance. The content audit tool may be configured to identify a plurality of pages of the website with one or more related topics from the set of semantically relevant topics and generating a content performance metric for each page of the plurality of pages. The content audit tool may be configured to output a topical content score for the content, the topical content score identifying a level of coverage of the topic by the content of the website.

In some embodiments, the content audit tool is further configured to filter content by at least one of company name, product name or people's names.

In some embodiments, the content audit tool is further configured to output a relevance score for each related topic of the set of one or more related topics.

In some embodiments, the content audit tool is further configured to output a count of a number of instances of each related topic.

In some embodiments, the content audit tool is further configured to output a total number of mentions of related topics in the content.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2E is an embodiment of a screen shot of a relevant topics table page;

FIG. 2G is another embodiment of a screen shot of a content audit page;

DETAILED DESCRIPTION

For purposes of reading the description of the various embodiments below, the following descriptions of the sections of the specification and their respective contents may be helpful:

Section A describes a network environment and computing environment that may be useful for practicing embodiments described herein.

Section B describes embodiments of systems and methods for a keyword research and analysis tool.

Section C describes embodiments of systems and methods for a crawler.

Section D describes embodiments of a storage medium including an ensemble of algorithms.

Section E describes embodiments of systems and methods for a topic tool.

Section F describes embodiments of systems and methods for a content audit tool.

Section G describes embodiments of systems and methods for a topic inventory tool.

A. Computing and Network Environment

Figure 1A:
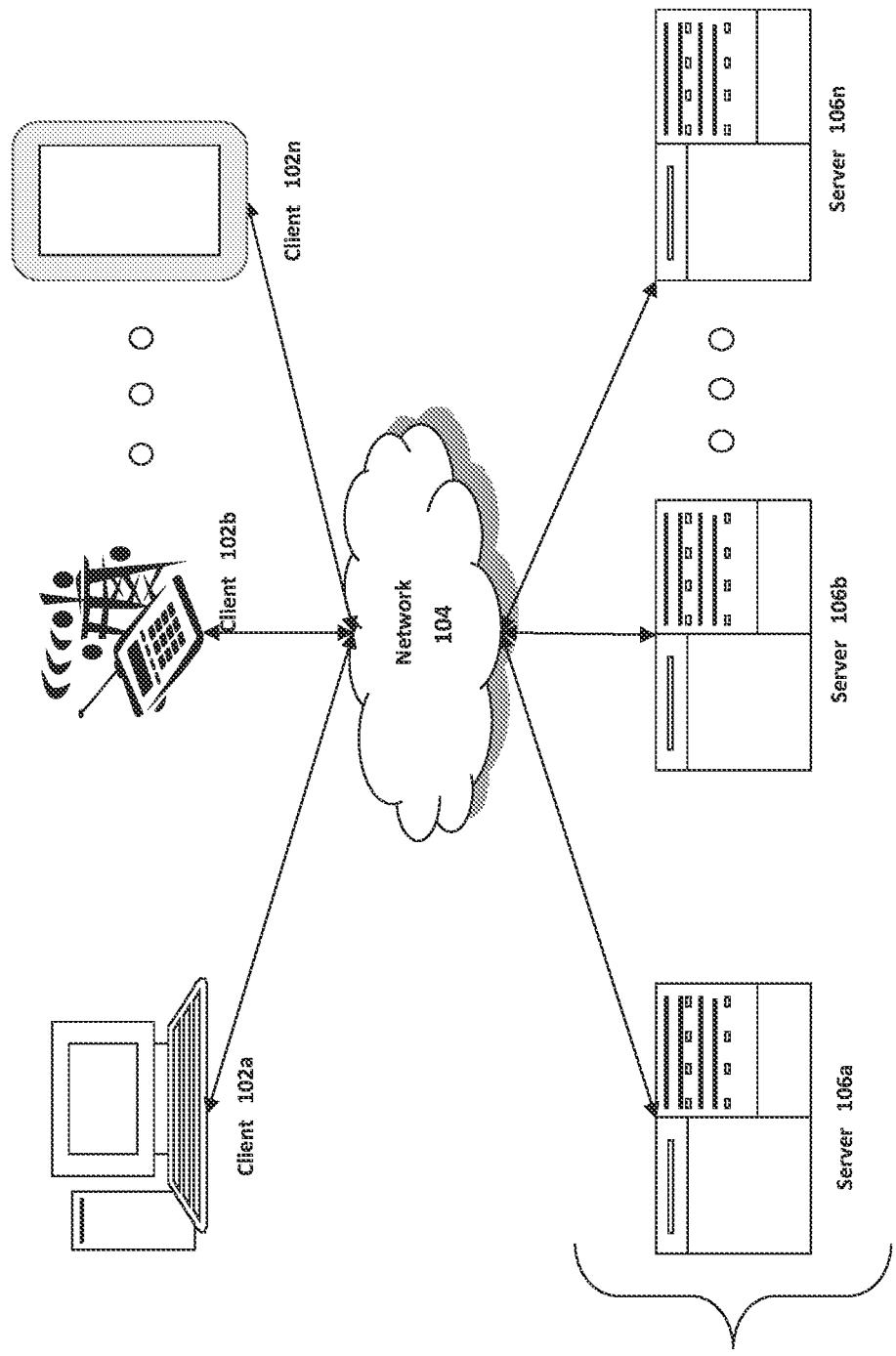
FIG. 1A is a block diagram depicting an embodiment of a network environment comprising client devices in communication with server devices.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
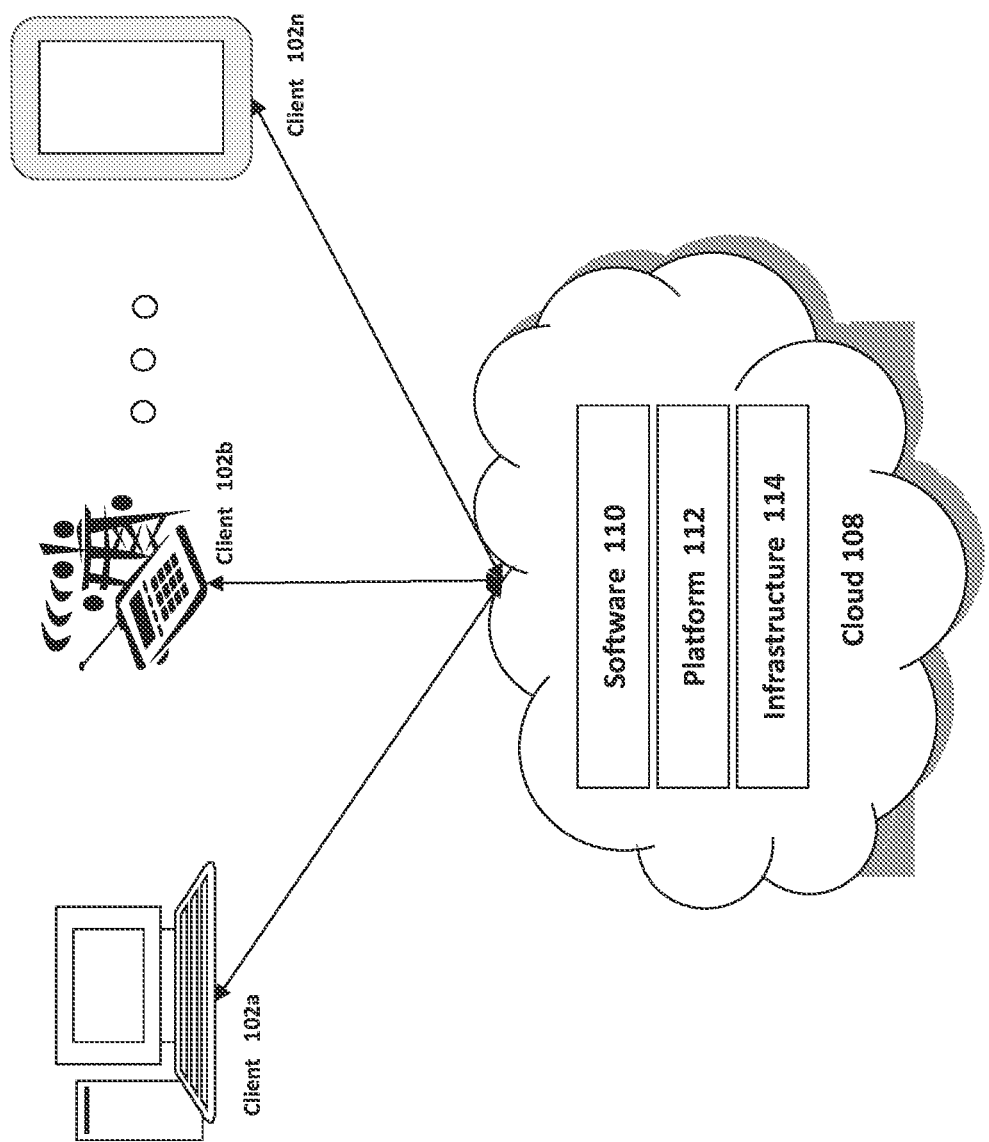
FIG. 1B is a block diagram depicting a cloud computing environment comprising client devices in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
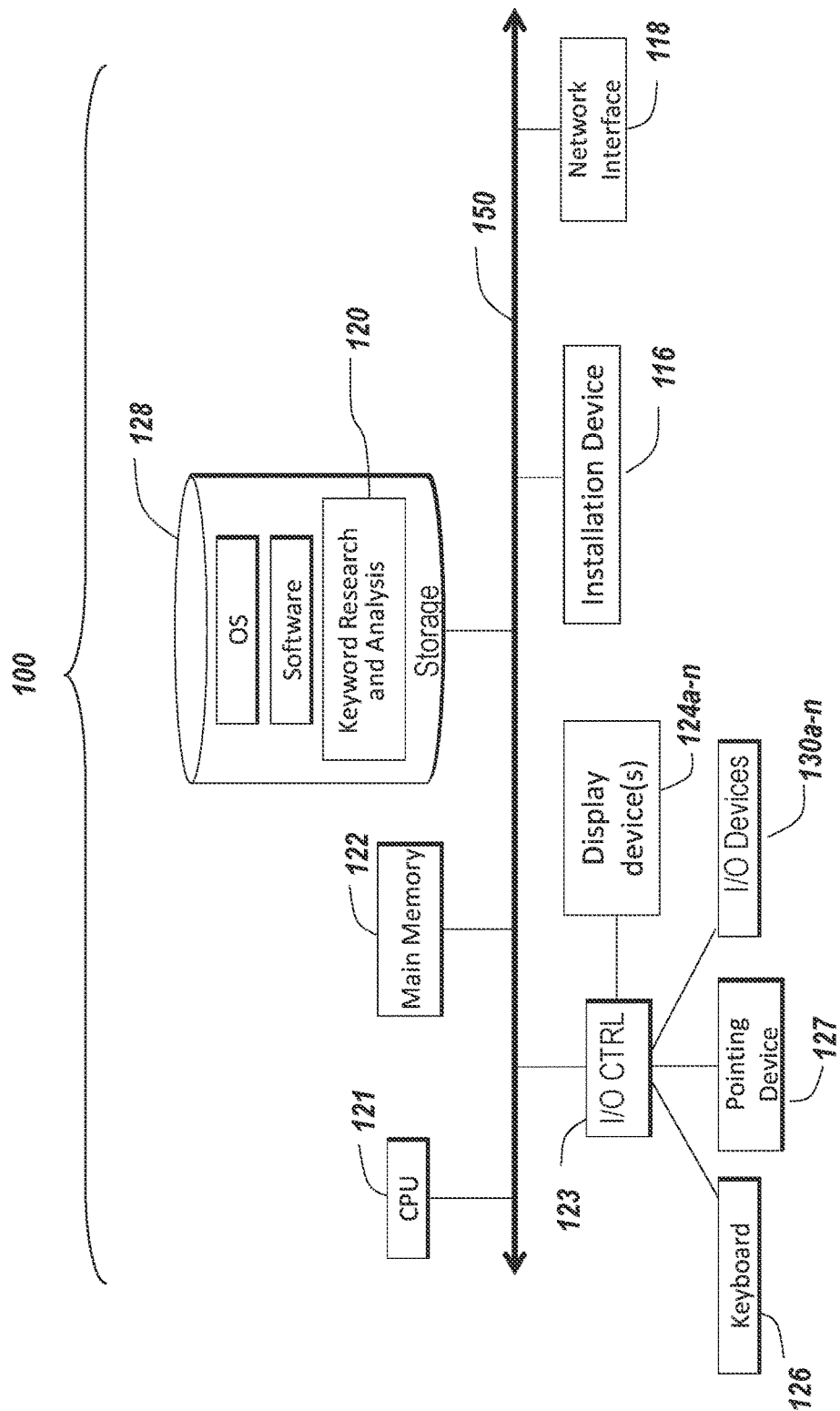
FIGS. 1C and 1D are block diagrams depicting embodiments of computing devices useful in connection with the methods and systems described herein.
Figure 1D:
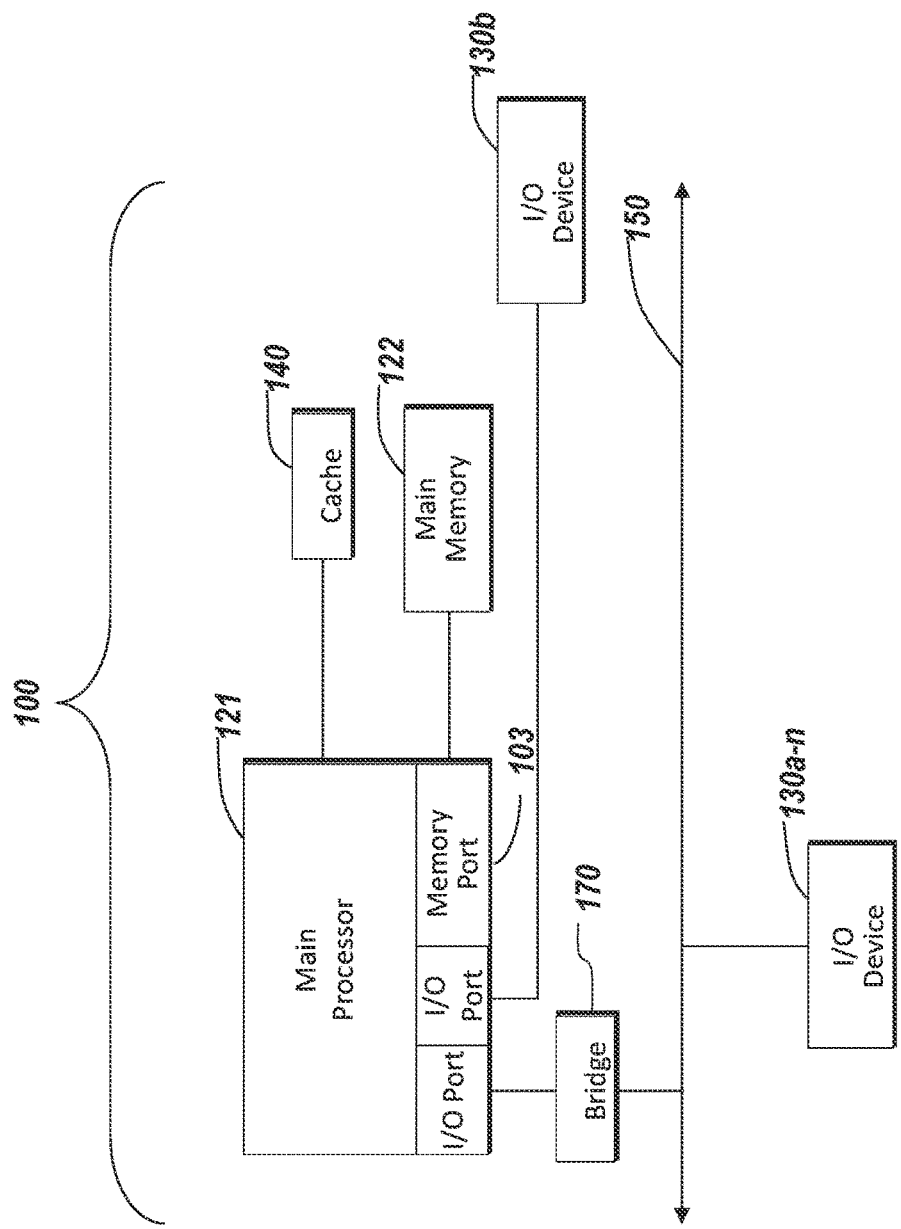

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a tool for keyword research and analysis 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the experiment tracker system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Keyword Research and Analysis Tool

Systems and methods of the present solution are directed to performing keyword research and analysis to generate a list of topically-related and conceptually related keywords to a specific topic, for example, for purposes of search engine optimization (SEO).

One aspect of the present disclosure is directed to systems and methods for performing a keyword search to generate a list of topically-related and conceptually related keywords to a specific topic to be marketed. In some embodiments, a keyword search tool can perform semantic keyword research and semantic content analysis. In one aspect of the present disclosure, there is provided a system and method for performing semantic keyword research (e.g., semantic SEO keyword research), which may quickly and efficiently generate a list of topically-related keywords. Unlike the traditional keyword planner and research tools, a tool may generate keywords that are conceptually-related to the topic that a user is marketing. For example, for the term "dog food," the tool can generate topics such as "pet food" and "doggy treats." The tool suggestions may then be ranked by relevance score, a measure of topical relevance, saving a user from hours of manual keyword research effort. In some embodiments, traditional applications include keyword research for prospecting and new clients, identifying new keywords for existing clients, and identifying relevant head terms for semantic SEO applications. In some embodiments, the systems and methods described herein can be used alongside a long-tail keyword tool (e.g., Google Keyword Planner) to identify new long-tail opportunities. Search engine marketing campaigns can be optimized with semantic machine learning.

In another aspect, the present disclosure is directed to system and methods for performing semantic content analysis. In some embodiments, the keyword search tool can be used with a content analyzer to help improve blog posts, landing pages, whitepapers and other content by identifying topical gaps. The content analyzer may use the keyword search tool data to notify a user of related keywords and topics that are missing from the user's current content. For example, a blog post on "dog food" may be silent in regards to "pet food," meaning "pet food" is not found in the body of the post. The content analyzer can highlight the gap. In some embodiments, the content analyzer highlights absolute gaps (e.g., whether a related keyword is totally missing from the website). In some embodiments, the content analyzer may highlight relative gaps (e.g., a related keyword that is mentioned on the website, but is not mentioned very frequently compared with the strength of relevance of the related keyword and the size of the website). In additional embodiments, the content analyzer may highlight topics that are mentioned overly often at a user's web site. Adding relevant keywords to content improves the quality of content and, due to greater topical authority, increases organic traffic.

Accordingly, aspects of the present disclosure are directed to a keyword search tool that can generate a list of topically-related and conceptually related keywords to a specific topic to be marketed. In some embodiments, the keyword search tool may be used to build keyword strategy. For example, the keyword search tool can generate a target keyword list for organic searches or identify keyword candidates. In some embodiments, the keyword search tool can be used to identify content needs. For example, the keyword search tool may crawl a domain site and identify gaps in content on the domain site and suggest high-value topics that are not being sufficiently covered. In some embodiments, the keyword search tool can be used to create content. For example, primary keywords and topic suggestions can be used to create content. For long-form content, the keyword search tool can suggest additional topics to cover.

Figure 2A:
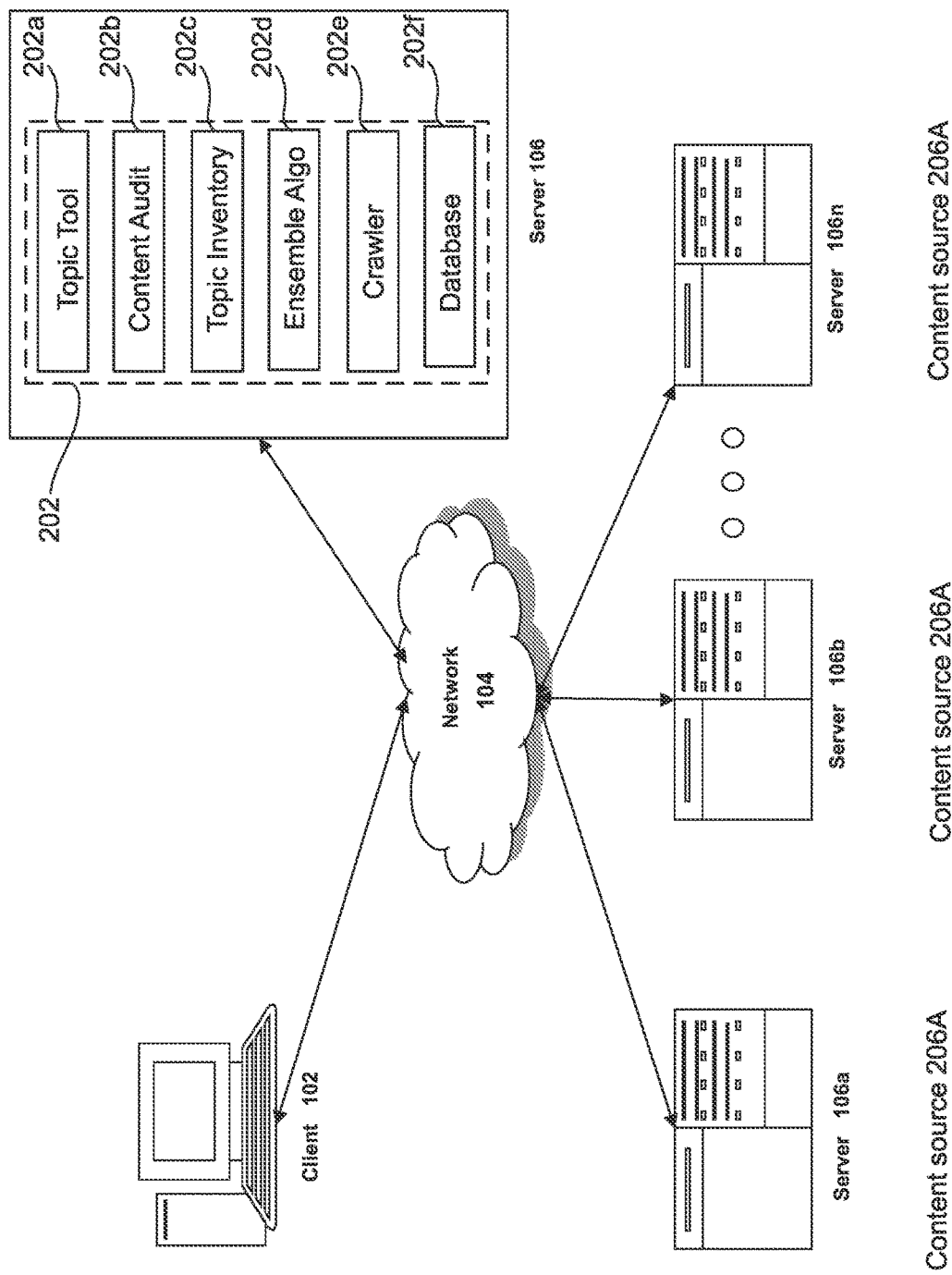
FIG. 2A is an embodiment of a system comprising a keyword research and analysis tool.

Referring to FIG. 2A, an embodiment of a computer environment similar to that illustrated in FIG. 1A is depicted. In addition to the elements previously described in connection with FIG. 1A, a server 106 including a keyword research and analysis tool ("keyword tool") 202 may also be connected to the network 104. Accordingly, the keyword tool 202 may be connected to the client(s) 102a-102n and the server(s) 106a-106n via the network 104. In addition, the server(s) 106a-106n may each be a content source 206A for providing content for research and analysis by the keyword tool 202. In various embodiments, the content may include data corresponding to websites, news articles, blog posts, keyword data, and/or any other suitable information for use with the keyword tool 202.

In the embodiment shown in FIG. 2A, the keyword tool 202 may include one or more components or modules for performing various functions corresponding to keyword research and analysis. In the embodiment of FIG. 2A, the keyword tool 202 includes a topic tool 202a, a content audit tool 202b, a topic inventory tool 202c, an ensemble algorithm tool 202d, a crawler 202e, and a database 202f. Each of these components are described in further detail below. In other embodiments, the keyword tool 202 may include less or more components, depending on the desired functions to be implemented by the keyword tool 202. For example, one embodiment of the keyword tool 202 may include the topic tool 202a and the content audit tool 202b only.

C. Crawler

According to various embodiments, the crawler 202e may be a tool for parsing and collecting relevant content over the web. In some embodiments, each of the other tools at the keyword tool 202, such as, but not limited to, the topic tool 202a, the content audit tool 202b, and the topic inventory tool 202c, may be connected to the crawler 202e and may operate in conjunction with the crawler 202e. In other words, the other tools may perform various operations on the content acquired by the crawler 202e.

In some embodiments, the crawler 202e at the keyword tool 202 may use one or more keywords to search the web for a plurality of different relevant web content sources. For example, the crawler 202e may acquire content by crawling and searching the web for the one or more keywords and any content related to the keywords. In various embodiments, the crawler 202e may be configured to acquire content from a variety of media, such as, but not limited to, websites, news articles, blog posts, keyword data (e.g., stored in the database 202f of the keyword tool 202), internet forums, social networking sites, advertising sites, and/or the like. The content to be acquired by the crawler 202e may be located at servers 106a-106n. The keyword tool 202 (e.g., the crawler 202e) may analyze the acquired content to build a collection of sources (e.g., articles, blogs, etc.) related to the input keywords. In some embodiments, the crawler 202e may be configured to perform advanced semantic processing, such as, but not limited to, stemming and lemmatization.

In some embodiments, the database 202f may include data acquired from one or more other sources. In some embodiments, the database 202f may include keyword data acquired or obtained from a search engine. In some embodiments, the database 202f may include keyword data acquired or obtained from a web site. In some embodiments, the database 202f may include keyword data acquired or obtained from a social networking site. In some embodiments, the database 202f may include keyword data acquired or obtained from a third party that aggregates data and provides data for use or purchase. Any of the systems and methods described herein, such any of any of the algorithms may use the data in the database 202f for any of the computations described herein, such as relevance scoring.

According to some embodiments, the crawler 202e may execute any suitable search software for crawling a given website. In particular embodiments, the crawler 202e may be configured to crawl the web by jumping from website to website. In other embodiments, the crawler 202e may be configured to capture all pages on a single website, as opposed to jumping from website to website. In such embodiments where the crawler 202e is capable of capturing all pages on a single website, the crawler 202e may have particularly configured parameters, such as, but not limited to, which directories to exclude, which special directories to include, directories and/or pages that the crawler 202e should merely visit but not index, and special customizations in terms of what pattern of pages to include or exclude. In other words, the crawler 202e may be configured to exclude certain elements of a website, while including certain other elements of the website.

In further embodiments, the crawler 202e may be configured to execute crawls so as not to weigh down or hinder servers. In particular embodiments, the crawler 202e may be configured to be limited in the number of webpages it fetches during a predetermined amount of time. As a non-limiting example, the crawler 202e may be configured to fetch no more than five pages per second. In additional embodiments, the crawler 202e may be configured to call the header of a page (e.g., HTTP HEAD request) before fetching the body of the page to retrieve information about the page to determine if the page is something that should be downloaded or not. In yet further embodiments, the crawler 202e may be configured to monitor a response time of a server. In other words, the crawler 202e may monitor how long it takes a server to send a response to a request, and if the response time drops below a predetermined threshold (e.g., five seconds), the crawler 202e may be configured to stand by for a predetermined amount of time (e.g., 20 seconds) before resuming crawling. In still further embodiments, after waiting for the predetermined amount of time, the crawler 202e may resume crawling at a slightly more cautious pace than previously exhibited. As a non-limiting example, the crawler 202e may crawl at a rate of four pages per second, as opposed to a previous rate of five pages per second. According to various embodiments, once the crawler 202e has retrieved sources relevant to the focus keywords, the crawler 202e may be configured to interact with any suitable indexing technology, such as, but not limited to, an open source software (e.g., Solr) for indexing of the content acquired by the crawler 202e. In such embodiments, the indexing technology for use with the crawler 202e may be configured to capture necessary fields, clean data, and/or perform statistical analyses on the acquired content.

D. Ensemble of Algorithms

According to various embodiments, the ensemble of algorithms 202d may be a storage medium for storing a plurality of algorithms to be accessed by each of the other tools at the keyword tool 202, such as, but not limited to, the topic tool 202a, the content audit tool 202b, and the topic inventory tool 202c, which all may be connected to the ensemble of algorithms 202d and may operate in conjunction with the ensemble of algorithms 202d. In other words, the other tools may access the ensemble of algorithms 202d and perform operations based on the instructions stored at the ensemble of algorithms 202d.

In some embodiments, the ensemble of algorithms takes as input a set or corpus of pseudo-relevant documents, such as content acquired by the crawler and provides a output a set of semantic-relevance-scored keyphrases or keywords. Accordingly, in various embodiments, in generating a set of semantically relevant topics scored or ranked by relevance, a tool may be configured to receive data corresponding to a corpus of pseudo-relevant documents (e.g., acquired by the crawler 202e), and may be instructed by the ensemble of algorithms 202d to cleanse and normalize the received documents and information. In some embodiments, the crawler 202e may be configured to lemmatize the documents as well. In some embodiments, the ensemble of algorithms 202d may instruct all descriptive phrase n-grams in the corpus up to some length to be identified. In some embodiments, the length of the n-grams may be predetermined by a user or administrator. Thresh-holding may then be performed using some function of frequency and available memory. Next, in some embodiments, phrases starting or ending with conjunctives or other stop words may be discarded. In some embodiments, the method includes building term frequency and inverse document frequency matrices to act as a shared resource for subsequent phrases. The most frequent morphological phrase forms may be re-allocated based upon a weight value assigned to the phrase. In some embodiments, a lemmatization-equivalent of uni-grams or phrases may be used to group. In further embodiments, the method includes estimating the bayesian prior of phrases. This may be done optionally as an adjunct to the term frequency matrix. In an embodiment, a linear combination of rarity-ranked bayesian priors of the constituent unigrams of the phrase is used.

In some embodiments, the ensemble of algorithms 202d includes instructions for applying an ensemble of a plurality of different classes of algorithms such as four constituent classes of algorithm. For example, term-ranking functions (TRFs) may be performed based on analysis of phrase distribution in corpus and the estimated phrase priors. First, a core phrase TRF may be performed (e.g., Robertson selection value and Kullback-Leibler distance). Second, a tail phrase TRF may be performed (e.g., Rocchio's weights, chi-square, and binary independence model). Third, a hyper-dictionary graph traversal algorithm may be performed (e.g. TextRank). Fourth, a semantic knowledgebases path traversal score based on terseness of semantic path and some curated predicate weights may be generated (e.g., using ConceptNet or Yago knowledgebases). Each constituent class of algorithm may itself be an ensemble of algorithms under that class, such that the ensemble of algorithms comprises a plurality of ensembles.

In some embodiments, the ensemble method may be a weighted combination of the sets of scored phrases from each of the above constituents (e.g. a linear combination, or a linear combination of some normalization of the constituents). The weights may be tuned by how tail-oriented the desired output is (e.g. where tail TRFs' output are weighed more heavily if more tail-like concepts are desired). In other embodiments, the weights may be tuned by how much n-grams of various n are desired (e.g. by multiplication of a function on desired lengths and phrase length under consideration). In some embodiments, unigrams with high bayesian priors are then reduced in the distribution's weights by some function of the unigram's prior. As such, the output of this method may be a set of semantic-relevance-scored phrases.

Although generally at times the word keyword may be used to described one or more keywords to be used by the systems and methods, keyphrases may be used interchangeably with keywords. In some embodiments, a keyphrase of one phrase is a keyword. In some embodiments, a keyword in a single phrase keyphrase. As such, in some embodiments, a plurality of keywords is a keyphrase.

E. Topic Tool

Figure 2B:
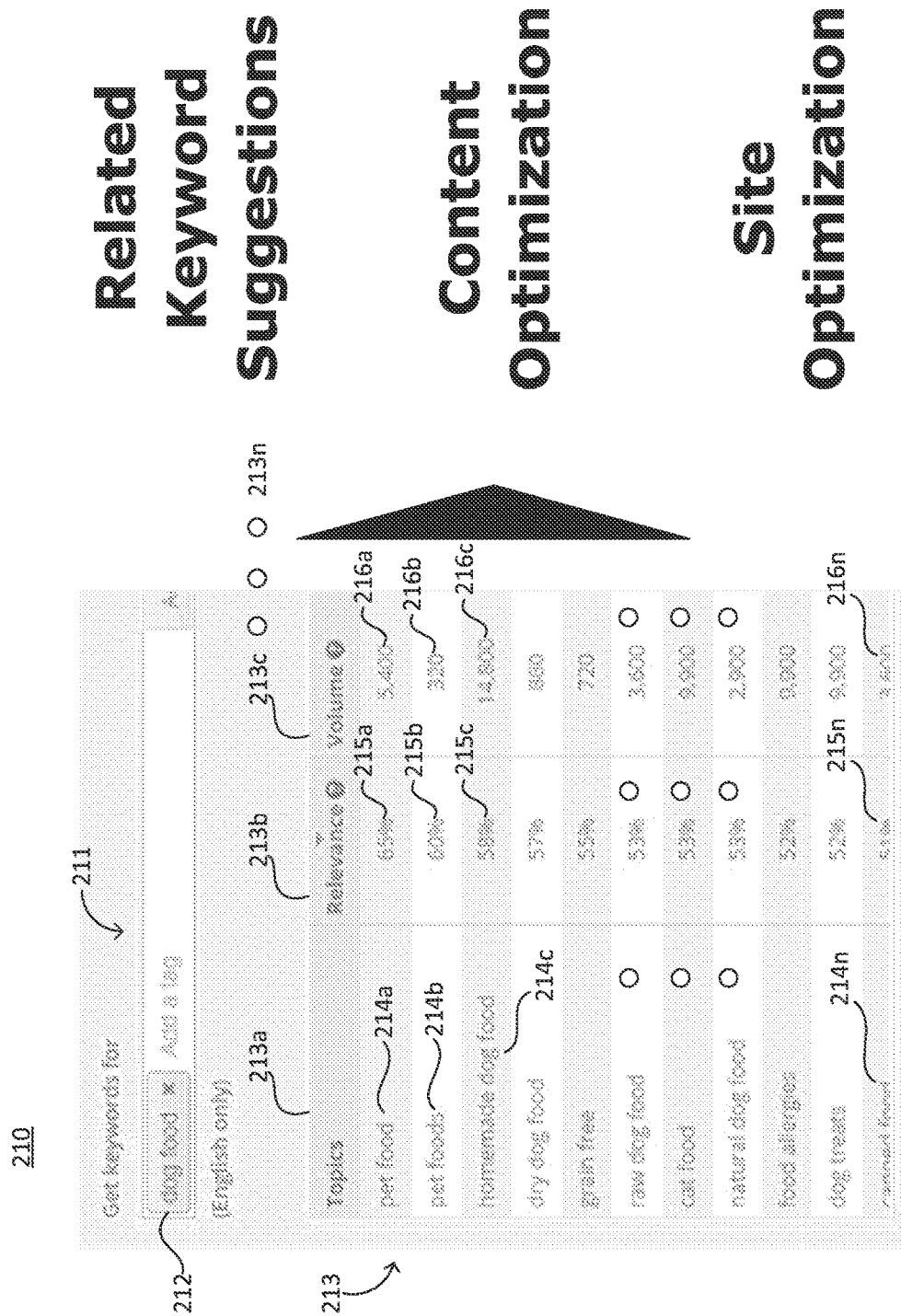
FIG. 2B is an embodiment of a screen shot of a topic tool page.

Referring to FIG. 2B, illustrated is an embodiment of a screen shot of a topic tool page. In various embodiments, the screen shot may represent a keyword user interface (UI) 210 to be presented to a user at the client device 102. After a user populates entries into the keyword UI 210 and submits the entries, the topic tool 202a may receive the entered information via the network 104 to perform one or more operations with respect to the user entries. The functions of the topic tool 202a are discussed further below.

According to the embodiment shown in FIG. 2B, the keyword UI 210 may include an input portion including a keyword field 211 for receiving and entering one or more user-entered keywords 212. In addition, the keyword UI 210 may also include an output portion including a topic table 213 for displaying topic results of the one or more operations performed with respect to the one or more keywords 212. The topic table 213 may include one or more column headers or subjects 213a-213n, each column header indicating a subject characteristic, attribute, or statistic associated with the topic results, for example, but not limited to, the name of the topic(s), a relevance score of the topic to the one or more entered keywords, a volume value of the topic, and/or the like. Each of the columns 213a-213n of the topic table 213 may include one or more corresponding resulting values 214a-214n, 215a-215n, and 216a-216n indicating results of the one or more operations performed by the topic tool 202a and corresponding to the one or more column headers 213a-213n.

In other embodiments, the keyword UI 210 may include any suitable variation of the layout illustrated in FIG. 2B, or even different layouts, for example, but not limited to, the keyword field 211 and the topic table 213 being in opposite locations at the keyword UI 210. In alternative embodiments, the user input interface may take on other suitable formats, for example, but not limited to, a list for user selection and/or the like. In some embodiments, the keyword field 211 may auto-populate the one or more keywords 212 as a user types into the keyword field 211. In further embodiments, a list of keywords may be stored in the database 202f, for example, to auto-populate the one or more keywords. In additional embodiments, the results of the one or more operations may be displayed in other suitable formats, for example, but not limited to, a chart, a graph, etc., or combinations thereof.

After entering the one or more keywords 212, and submitting the entries, the topic tool 202a may identify topics that are relevant to the entered one or more keywords 212. In one embodiment, the topic tool 202a identifies and generates a set of semantically relevant topics to the one or more keywords 212. In one embodiment, the results of the one or more operations performed by the topic tool 202a are displayed at a topic table 213 at the first column 213a. The column 213a may list the identified one or more topics that are related to the one or more user-entered keywords 212 as topic results 214a-214n. In various embodiments, the crawler 202e searches the web to acquire the topics 214a-

214*n* related to the keywords 212. The method and operation of identifying and generating the topic list 214*a*-214*n*, performed by the keyword tool 202, are described in further detail below in connection with FIG. 2C.

In further embodiments, the topic tool 202*a* may perform additional analyses with respect to the identified topic results 214*a*-214*n*, and generate results of the additional analyses for viewing at the topic table 213. In the embodiment shown in FIG. 2B, an additional analysis may include a relevance analysis for each topic result 214*a*-214*n*. According to the present embodiment, the results of the relevance analysis may be displayed under column 213*b* as relevance scores 215*a*-215*n* associated with the corresponding topic results 214*a*-214*n*. According to various embodiments, the relevance scores 215*a*-215*n* are a measure of topical relevance and indicate a strength of relevance between the one or more keywords 212 and the corresponding topic result 214*a*-214*n*. According to the present embodiment, the relevance scores 215*a*-215*n* take the form of percentages (e.g., out of 100%) to indicate the strength of the corresponding topic 214*a*-214*n* (e.g., the higher the percentage, the more relevant the corresponding topic 214*a*-214*n* is). In other embodiments, the relevance scores 214*a*-214*n* may be embodied in any suitable form to indicate the strength of relevance of a topic 214*a*-214*n* to a user-entered keyword 212, such as, but not limited to, color representation (e.g., where a shade or type of color indicates topic relevance strength), tally representation (e.g., where a number of displayed stars indicates relevance strength), meter representation, and/or the like. In the present embodiment, the topics 214*a*-214*n* are sequenced or ranked by their corresponding relevance scores 215*a*-215*n* in descending order. In other embodiments, the topics 214*a*-214*n* may be ranked in any suitable sequence, such as, but not limited to, according to volume values of the topics 214*a*-214*n*, according to alphabetical order, or according to any other suitable characteristic of the topics. In some embodiments, the topics 214*a*-214*n* may be actively ranked according to a user preference.

Similarly, a further additional analysis may include a volume analysis for each topic result 214*a*-214*n*. In some embodiments, the results of the volume analysis may be displayed under column 213*c* as volume values or scores 216*a*-216*n* associated with the corresponding topic results 214*a*-214*n*. According to some embodiments, the volume values 215*a*-215*n* are an indication of how often the corresponding topic result 214*a*-214*n* have been used in various forms of media, such as, but not limited to, social networking websites, marketing tools and databases, websites, news articles, blog posts, other forms of internet related advertising, and/or the like. According to the present embodiment, the volume values 216*a*-216*n* take the form of a number of hits or a measure of frequency to indicate the volume of the corresponding topic 214*a*-214*n*. In further embodiments, the volume score 216*a*-216*n* indicates a frequency in terms of individual instances, number of webpage hits, frequency in title hits, a number of pages where the corresponding topic occurs, and/or the like. In other embodiments, the volume values 216*a*-216*n* may be embodied in any suitable form to indicate the volume or relative volume of a topic 214*a*-214*n*, such as, but not limited to, color representation, tally representation, meter representation, and/or the like.

By way of example, according to the embodiment shown in FIG. 2B, a user of keyword UI 210 may enter into the field 211 "dog food" as a keyword, and submit the keyword 212 for analysis by the topic tool 202*a*. Accordingly, the topic tool 202*a* may output a list in the form of topic table 213 of topics 214*a*-214*n* related to the keyword "dog food," such as "pet food," "pet foods," "homemade dog food," etc. Furthermore, the topic tool 202*a* may rank these topics according to their relevance to the keyword "dog food," as indicated by the relevance scores 215*a*-215*n*. In this embodiment, the topic "pet food" corresponds to a relevance score of 65% to the user-entered keyword "dog food." In addition, the topic "pet food" corresponds to a volume value of 5,400. As such, a user may read and interpret the information embodied in topic table 213 and can identify further keywords or topics to include in their content to improve the quality of the content and to increase organic traffic to the website by using the topic table 213 for SEO. The listed topics 214*a*-214*n* may be included to enhance traffic to any webpage, as desired, such as, but not limited to, blog posts, websites, forum postings, articles, and/or the like.

Figure 2C:
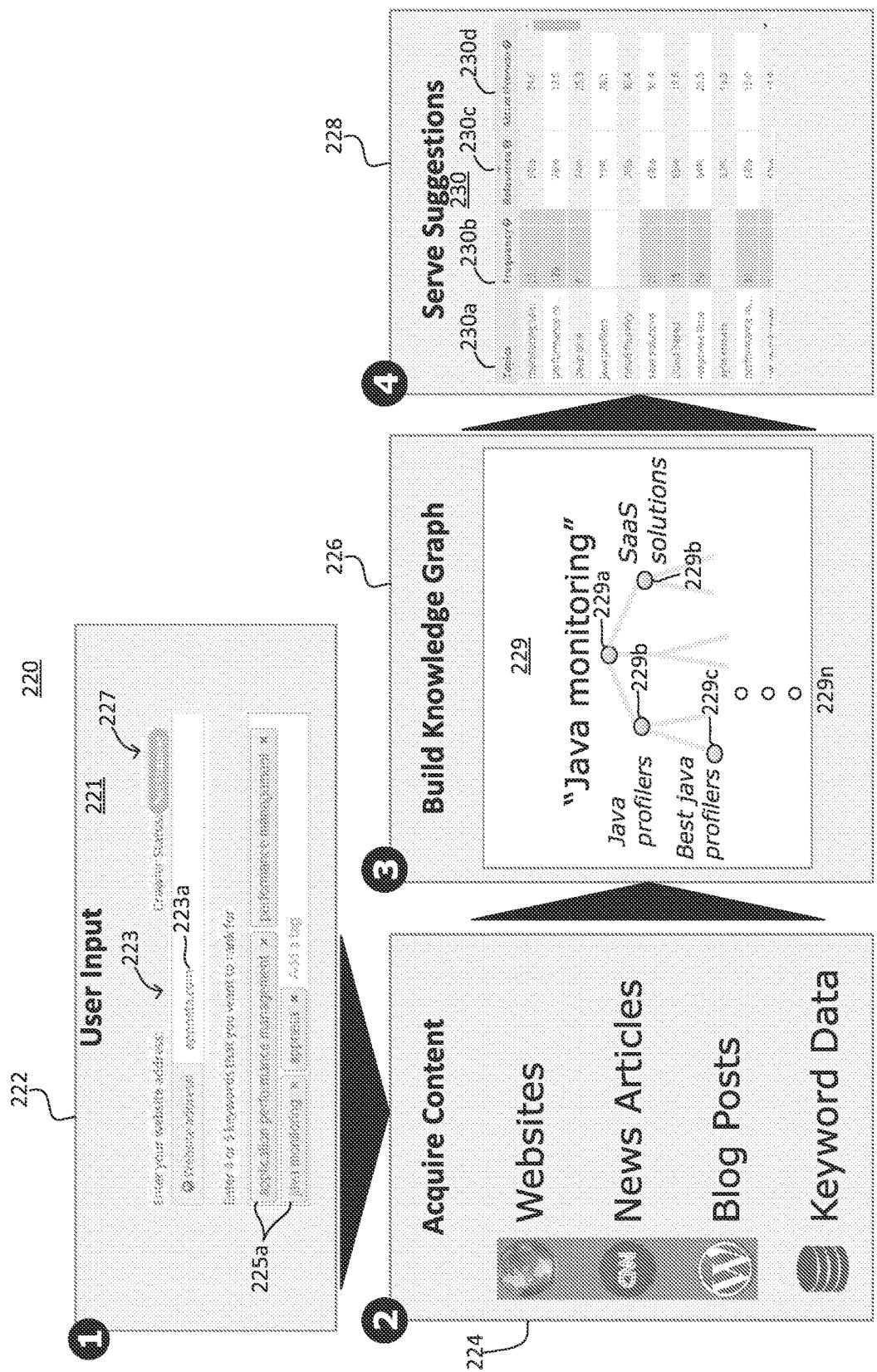
FIG. 2C depicts a block diagram of a method for generating related keywords.

Referring to FIG. 2C, a block diagram of a method 220 for performing keyword research and analysis of a website is depicted. The method may result in a list of suggested keywords to be added to the user's website for SEO. The method and algorithms described in connection with FIG. 2C may also be utilized in connection with the embodiments described in connection with FIG. 2B, where applicable. In the present embodiment, the method 220 may include a user input block 222, an acquire content block 224, a build knowledge graph block 226, and a serve suggestions block 228.

According to various embodiments, the block 222 may be performed at a user interface 221 at a client 102. The UI 221 may include a focus keyword field 225 (similar to the keyword field 211) for a user to populate with one or more focus keywords 225*a* (similar to the one or more keywords 212). The UI 221 may further include a website field 223 for a user to populate with a website address 223*a* that the user wishes to perform the keyword analysis on. In some embodiments, the focus keywords 225*a* may be words or topics a user or administrator uses or plans to use at the website address 223*a*. In various embodiments, the website address 223*a* is a Uniform Resource Identifier (URI), a Uniform Resource Locator (URL), a Uniform Resource Name (URN), or any other suitable protocol for identifying a website address. The UI 221 may further include a crawler status field 227 for identifying a status of the crawler 202*e*. In some embodiments, the crawler status field 227 may indicate whether the crawler 202*e* is running or not, whether the crawler 202*e* has completed its crawls, whether the crawler 202*e* is inactive or disabled, and/or the like. During block 222, a user may provide the website address 223*a* for performing content auditing on and the one or more focus keywords 225*a* to be researched and analyzed. After the fields of the UI 221 are populated and submitted by a user, the entered information may be transmitted to the keyword research and analysis tool 202 via the network 104, at which one or more operations may be performed corresponding to the focus keywords 225*a* and the website address 223*a*, as described below.

According to various embodiments, at block 224, the submitted focus keywords 225*a* are received by the crawler 202*e*. The crawler 202*e* may then acquire content from various web sources to build a corpus of collected content that is relevant to the focus keywords 225*a*. Further details regarding the operation of the crawler 202*e* are described above.

According to various embodiments, at block 226, after collecting and indexing the relevant sources from the web (e.g., via the crawler 202*e*), a knowledge graph 229 may be generated by applying, by the keyword tool 202 (e.g., by the topic tool 202*a*), the ensemble of algorithms 202*d* to the content acquired by the crawler 202*e* to identify and organize a set of semantically relevant topics from the acquired content, as illustrated in the knowledge graph 229. In some embodiments, the step of generating a knowledge graph 229 may be optional, and the topic tool 202*a* may directly output the related topic results to the user based on the results of application of the ensemble of algorithms to the acquired content, and skip the building of any knowledge graph.

In various embodiments, the knowledge graph 229 is a knowledge base that organizes information gathered from the various web sources to provide structured and detailed information regarding each of the user-entered one or more focus keywords 225*a*. In some embodiments, after the topic tool 202*e* applies the ensemble of algorithms 202*d*, as described above, to the content acquired by the crawler 202*e* to generate the semantically relevant topics scored by relevance, the knowledge graph 229 may be built based on the semantically relevant topics scored by relevance. In other words, the knowledge graph 229 may be a representation of the semantically relevant topics that are ranked by relevance. In some embodiments, the knowledge graph 229 includes degrees of conceptual relevance to the initially entered focus keywords 223*a*, which serve as the seed terms from which the knowledge graph is built. For example, as illustrated in the embodiment of FIG. 2C, one of the focus keywords 225*a* is "java monitoring," which is located at a first level (or seed level) 229*a* of the knowledge graph 229. After applying the above described algorithm to the content previously acquired by the crawler 202*e*, the topic tool 202*a* may be configured to populate lower levels of the knowledge graph branching out from the seed level 229*a*. In the present embodiment, the topic "java profilers" and "SaaS solutions" were identified as having relatively high relevance, based on the acquired content and as determined using the above-described algorithms, to the focus keyword "java monitoring." Accordingly, the topic "java profilers" and "SaaS solutions" are placed closest to the seed term "java monitoring" on the knowledge graph at the second level 229*b* of the knowledge graph. Similarly, the topic "best java profiler" was determined to be less relevant than the terms at level two 229*b*, but still relevant to the focus keyword "java monitoring," and so is placed at a third level 229*c* of the knowledge graph 229, and so on.

Referring to block 228, based on the knowledge graph 229 built in block 226, topic suggestions may be served to the user (e.g., by the topic tool 202*a*) and displayed at the UI via suggestion table 230. In other embodiments, the topic suggestions are served based directly on the results of the topic tool's application of the ensemble of algorithms to the acquired content, rather than based on a knowledge graph. In some embodiments, the knowledge graph 229 may be compared with the content identified from the initially entered web address 223*a*. Accordingly, keyword performance data and high-priority gaps in keywords at the web address 223*a* may be identified and highlighted.

The suggestion table 230 may be for displaying topic results identified by the knowledge graph 229. The suggestion table 230 may include one or more column headers or subjects 230*a*-230*d*, each column header indicating a subject characteristic, attribute, or statistic associated with the topic results, for example, but not limited to, the name of the topic (230*a*), a relevance score of the topic (230*b*), a frequency of the topic (230*c*), an attractiveness of the topic (230*d*), and/or the like. Each of the columns 230*a*-230*d* of the suggestion table 230 may include one or more corresponding resulting values indicating results of that particular column 230*a*-230*d*. The name of the topic column 230*a* may include a plurality of topics identified by the knowledge graph 229 as being relevant to the focus keywords 225*a*. The values at the frequency column 230*b* may indicate the number of instances corresponding topics occur at the web address 223*a*. The frequency column 230*b* may be similar to the volume column 213*c*. The values of the relevance column 230*c* may indicate a degree of relevance a corresponding topic is to the focus keywords 225*a*. The relevance column 230*c* may be similar to the relevance column 213*b*. The values of the attractiveness column 230*d* may indicate a strength of the suggestion according to a topic, and may be based on the frequency and relevance values of a given topic. The attractiveness value may be a combination of the relevance score in combination with one or more keyword metrics. In some embodiments, the attractiveness score is determined by applying certain weights on each of the frequency value and the relevance value. As an example, the higher the relevance score and the lower the frequency score corresponding to a topic are, the higher the attractiveness score for that topic may be. In further embodiments, the suggested topics may be provided to the user in a list format and ranked by at least one of the frequency score, the relevance score, and the attractiveness score. In other embodiments, the suggested topics may be ranked in other orders depending on a preference of the user or administrator.

In some embodiments, a competitor's website may be entered as the web address 223*a* so that a user may analyze competitor content. In such embodiments, the topic tool 202*a* may crawl one or more competitor sites, analyze their mentions, and compare the competitor content to the content of a user's website. This competitor analysis feature may be utilized by the other tools of the keyword tool 202 as well (e.g., content audit tool 202*b* and topic inventory tool 202*c*)

Accordingly, in some embodiments, the suggestion table 230 may highlight the absolute gaps between the listed related topics and the website at web address 223*a* (e.g., whether a related topic is totally missing from the website of web address 223*a*, which may be indicated by a corresponding frequency or volume score of 0). In some embodiments, the content analyzer may highlight relative gaps between the listed related topics and the website at web address 223*a* (e.g., a related keyword that is mentioned on the website, but is not mentioned frequently). In some embodiments, relative gaps may be determined based, for example, the strength of relevance of the related keyword and the size of the website (e.g., a highly relevant topic that is not mentioned too often at a large website may qualify as a relative gap).

In some embodiments, the suggestion table 230 may also highlight related topics that may be mentioned very often. For example, if a topic has a very high number of mentions (e.g. as indicated by the topics frequency and/or volume score), a user may be prompted to focus efforts on other topics rather than add content concerning the topic that is frequently mentioned. For example, if a user sees a high number of mentions, titles, and pages containing a topic and related topics, the topic may already have coverage and the collection of content that is a) targeted for the topic, and b) contains the topic, may be examined further so that the performance of those pages may be evaluated. If it is determined that the user is a top authority on the topic, the user may decide that there are other priority topics in which to invest content. However, for other customers, this scenario may lead to using the various tools in the keyword tool 202 to improve content that has mentions of the highly occurring target topic, such as, but not limited to, content audit to evaluate the pages containing the topic, competitive analysis to determine other sites' mentions and architecture, and other strategic planning initiatives that take advantage of the existing coverage or more beneficially position the existing coverage. For example, if a user sees that they have a very high number of mentions of a topic, but no mentions in any titles, the user may consider planning initiatives that look at whether there should be content created or updated to refine targeting for the pages and include the topic in titles. As another example, if the customer sees that they have a very high number of mentions of a topic, mentions in titles and a lot of pages containing the topic, but they receive no traffic and have no rankings on that topic, that may be an indication that there is more investigation into that topic required and that there may be other needs and problems. For example, a problem may be that the content where the mentions occur is not comprehensive enough, is low quality, or competition is very high and more work is needed to establish rankings for this topic and related keywords with respect to the competition. As yet another example, if the user sees that they have a very high number of mentions of a topic, mentions in title and many pages containing the topic, but they receive no traffic and have many rankings on that topic and related keywords/topics, that may signal that there may be much opportunity for them to add pages for additional keyword variants and related topics with the confidence that they will perform well quickly after publication of the added topic. Accordingly, a user may take advantage of the existing coverage to direct or guide additional content development or planning.

Figure 2D:
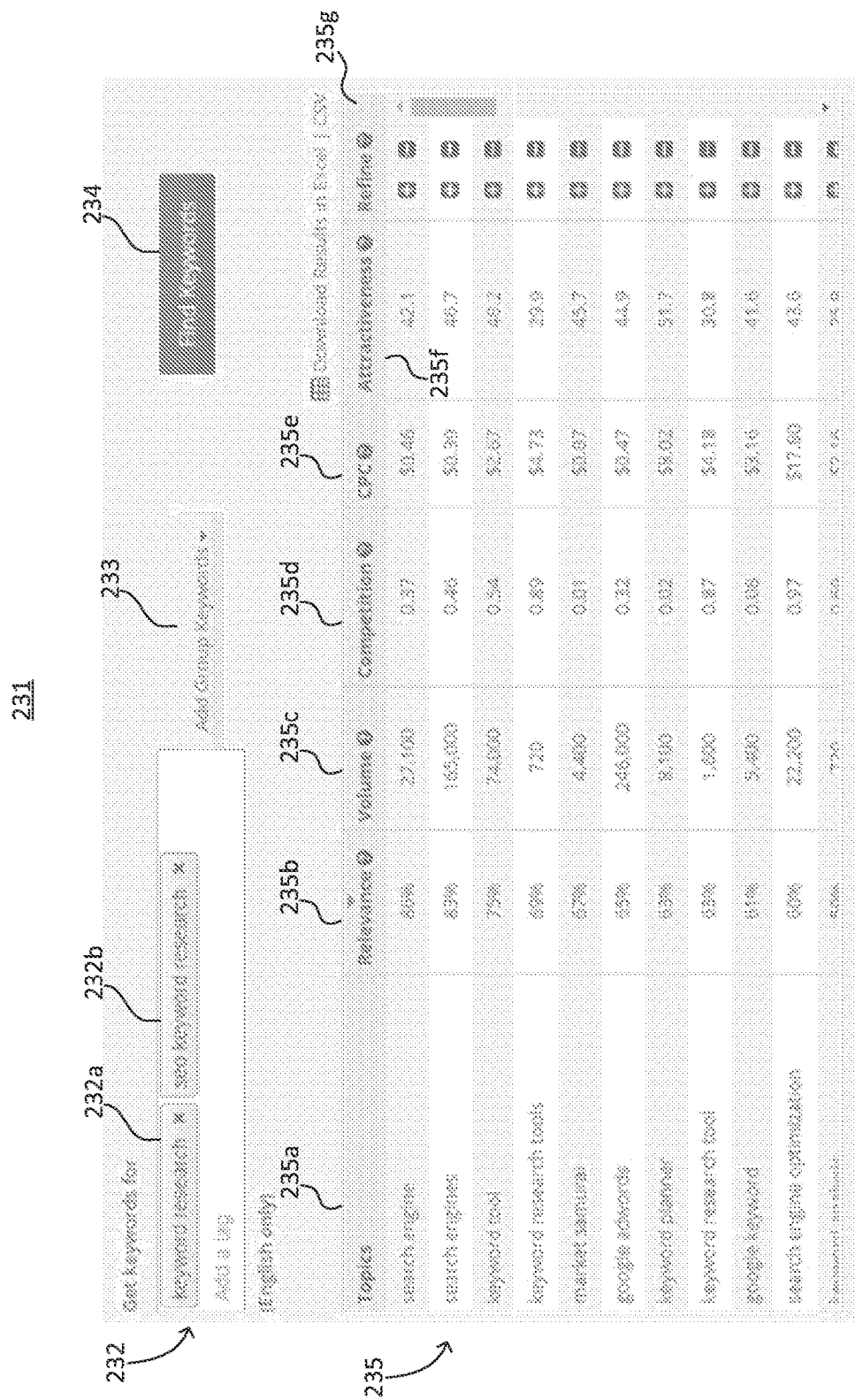
FIG. 2D is an embodiment of a screen shot of a topic tool page.

Referring to FIG. 2D, another embodiment of a keyword user interface 231 is illustrated. The keyword UI 231 may be similar to keyword UI 210, but may include expanded features related to ranking of relevance for suggested topics. According to the embodiment shown in FIG. 2D, the keyword UI 231 may include an input portion including a keyword field 232 for receiving and entering one or more user-entered keywords 232a and 232b. In addition, the keyword UI 232 may also include an output portion including a topic table 235 for displaying topic results with respect to the one or more keywords 232a and 232b. The topic table 235 may include one or more column headers or subjects 235a-235g, each column header indicating a subject characteristic, attribute, or statistic associated with the topic results, for example, but not limited to, the name of the topic (235a), a relevance score of the topic (235b) to the one or more entered keywords 232a and 232b, a volume value of the topic (235c), a competition score (235d), a cost per click (CPC) value (235e), an attractiveness score (235f), a refining option (235g), and/or the like. Each of the columns 235a-235g of the topic table 235 may include one or more corresponding resulting values indicating results of the one or more operations performed by the topic tool 202a. In some embodiments, the data of the topic table 235 is obtained by implementing the ensemble of algorithms 202d described above as implemented by the topic tool 202a.

In some embodiments, the topic column 235a, the relevance column 235b, the volume column 235c, and the attractiveness column 235f may be similar to the topic column 213a, the relevance column 213b, the volume column 213c, and the attractiveness column 235f, respectively. In some embodiments, the respective attractiveness values of the column 235f may be determined based on one or more of the corresponding values of one or more of the columns 235a-235g. In some embodiments, the values under the competition column 235d may indicate a competition or competitive value for the keyword. In some embodiments, the competition value or score indicates a number of advertisers bidding on each keyword relative to other or all keywords across one or more search engines or paid advertising sources. In some embodiments, the competition value or score indicates a relative demand for the keyword among other keywords. In some embodiments, the competition score may be a numeric value in a range. In some embodiments, the competition score may be a string indicating a level of completion to use the keyword. In the "Competition" column, you can see whether the competition for a keyword idea is low, medium, or high." In some embodiments, the refine column 235g may allow a user to adjust a corresponding topic, such as, but not limited to, deleting the row of the corresponding topic, adding or deleting statistics or information of the corresponding topic (e.g., deleting the competition score for the corresponding topic), and the like. In particular embodiments, the topics under the topic column 235a may be ranked by the relevance score. In other embodiments, the topics may be ranked by any of the various scores assigned to them.

The CPC or cost-per-click value or score may indicate the amount one may earn each time a user clicks on an ad related to the keyword. The CPC value may be a historical or average amount to indicate how much that keyword has earned via paid advertising. The CPC may be determined over any time period from any one or more sources. The CPC may be an average, mean or other statistical measure. In some embodiments, the CPC value may be an indicator of predicted or future value of an amount the keyword should earn via advertising.

In further embodiments, the UI 231 may include an add group keywords interface 233. The add group keywords interface 233 may aid a user by adding multiple related keywords to the keyword field 232, for example, by providing keyword suggestions, by parsing the keyword field 232 to automatically add related keywords, by providing general keyword subjects that will populate the keyword field 232 with more narrow keywords under the keyword subject, and the like. In yet further embodiments, the UI 231 may include a find keywords interface 234 for aiding a user in identifying and selecting useful keywords. In such embodiments, the find keywords interface 234 may provide the user with a list of subject areas containing useful keywords, may suggest keywords based on the entered keywords 232a and 232b, and the like.

Referring to FIG. 2E, another embodiment of a topic table 240 ranked by relevance is depicted. According to the present embodiment, topic table 240 includes a topic column 240a and a relevance column 240b having relevance values associated with the topics under the topic column 240a. In some embodiments, the topic column 240a and the relevance column 240b may be similar to the topic column 213a and the relevance column 213b, respectively. Furthermore, the topic table 240 may be generated by utilizing the ensemble of algorithms 202d by the topic tool 202a. The topic table 240 displays a generated list of recommended topics with only a relevance score displayed for each topic. The topics may be organized according to the relevance score, from highest score to lowest score.

F. Content Audit Tool

Figure 2F:
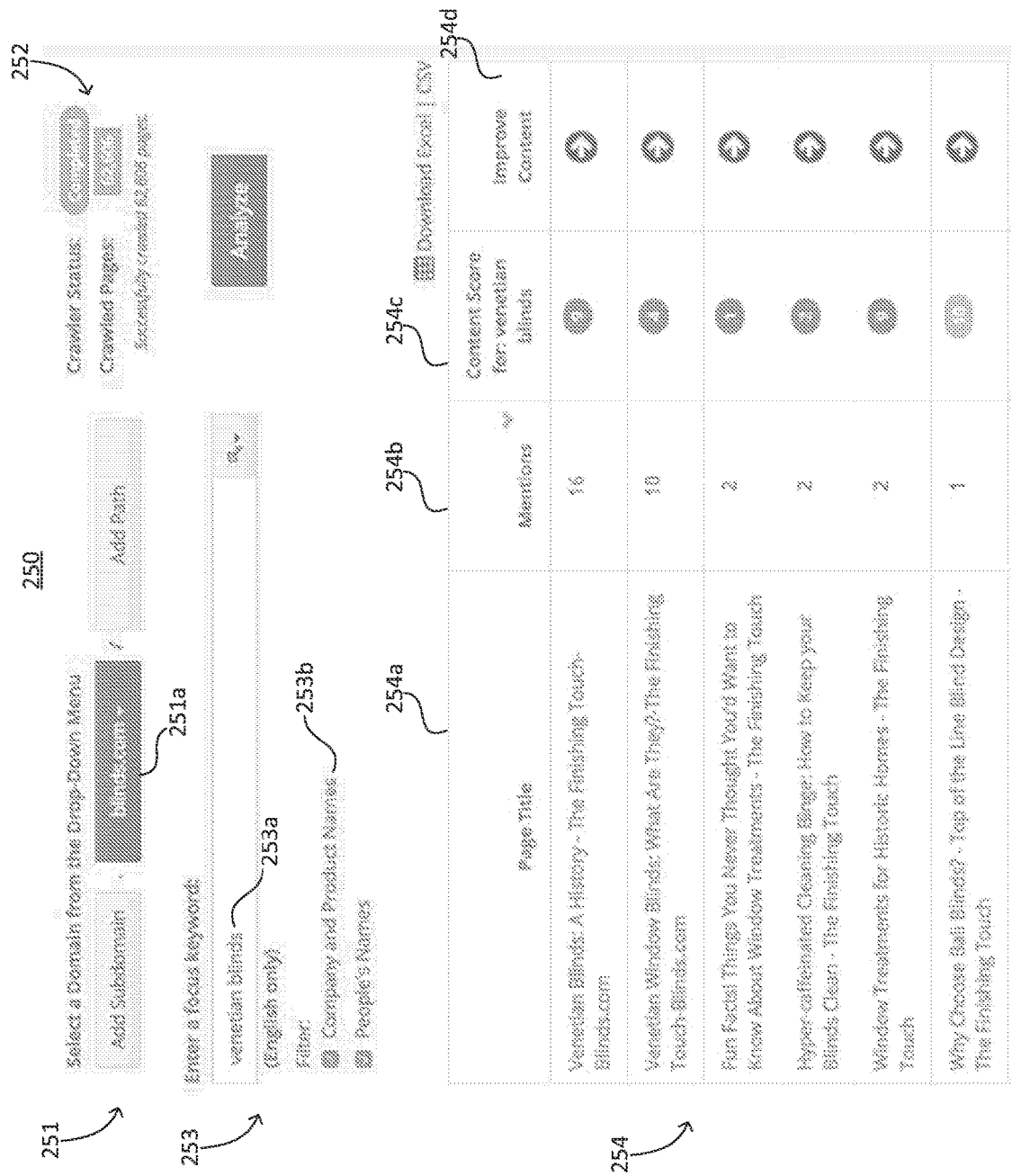
FIG. 2F is an embodiment of a screen shot of content audit page.

Referring to FIG. 2F, an embodiment of a content audit user interface 250 corresponding to the content audit tool 202b is depicted. According to the present embodiment, the content audit UI 250 includes a domain or subdomain input field 251 for entering a web address 251a. The web address 251a may correspond to a website or webpage for which a user wishes to perform the content audit operation. In addition, the UI 250 includes a crawler status field 252, which may be similar to the crawler status field 227 and may further identify a number of pages crawled by the crawler 202*e* after completion of the crawling function. The UI 250 may further include a focus keyword field 253 for entering a focus keyword 253*a*. In some embodiments, the focus keyword field 253 may be similar to the keyword field 211, and may further include one or more filters 253*b*. In particular embodiments, the filters 253*b* may serve to exclude or include particular categories of terms from the results of the content audit (e.g., "People's Names").

After entering and submitting the relevant input data, the input data may be received by the content audit tool 202*b* for performing the content audit functions, that is, to analyze the pages corresponding to the website address 251*a* for identifying all the pages that are relevant to the entered focus keyword 253*a* and for calculating content performance metrics for each of the retrieved pages. In particular embodiments, the web address 251*a* may be crawled by the crawler 202*e* to acquire content of the web address 251*a*. In further embodiments, the content audit tool 202*b* may be configured to identify all of the pages of the web address 251*a* that are relevant to the entered focus keyword 253*a*, and configured to generate content performance metrics for each of the relevant pages. In some embodiments, the content performance metrics include a content score for each retrieved page, the content score for indicating how well a particular page covers the topic denoted by the focus keyword 253*a*. In one embodiment, the content score may be calculated by generating a set of related topics (e.g., by the content audit tool 202*b* in conjunction with the ensemble of algorithms 202*d*), and count the number of mentions the topics have on a given page. In such an embodiment, if a relevant topic is mentioned once on a given page, a first predetermined amount of points are attributed to that page (e.g., one point), and if a relevant topic is mentioned two or more times at the page, a second predetermined number of points may be attributed to the page (e.g., two points). In particular embodiments, the content audit tool 202*b* may provide 50 topic suggestions per keyword input, in such embodiments, a maximum score that a page may receive is therefore 100 (e.g., if each of the topics was mentioned twice at the page). In other embodiments, any suitable method of calculating a content score may be implemented, such as, but not limited to, a simple count of the number of mentions of the topic keywords at a page, a weighted count of the mentions (e.g., more weight may be to a topic mentioned in the title of the page), and/or the like.

In some embodiments, the UI 250 further includes a content audit table 254 including a plurality of columns, such as, but not limited to, a page title column 254*a*, a mentions column 254*b*, a content score column 254*c*, and an improve content option 254*d*. After analyzing the website address 251*a* for mentions of related topics to the focus keyword 253*a*, the resulting data may be organized and displayed in the audit table 254 so that a user may review the results. For example, each of the titles of each of the pages mentioning a relevant topic may be listed under column 254*a*, and the corresponding number of mentions of the relevant topics may be listed under column 254*b*. In addition, the content score of each of the listed pages may be listed under column 254*c*. In some embodiments the content score may be a simple number of points attributed to the corresponding page. In other embodiments, the content score may be illustrated in any other suitable way, such as, but not limited to, a tally, a color, and the like. In the present embodiment, the number corresponding to the content score may also be highlighted with different types or different shades of color to represent the strength of the content score. In some embodiments, each of the listed pages may correspond to an improve content option listed under column 254*d*. In particular embodiments, the improve content option, once actuated by a user, may provide suggestions for a user to modify the corresponding page to improve its content score. For example, the content audit tool 202*b* may suggest keyword topics, for incorporation into the page, that are relevant to the focus keyword 253*a*. Accordingly, using the content audit tool 202*b*, a user may, all at once, identify pages on a website that are highly relevant to a focus keyword, or pages that require modification to increase their relevance to the focus keyword.

Figure 2G:
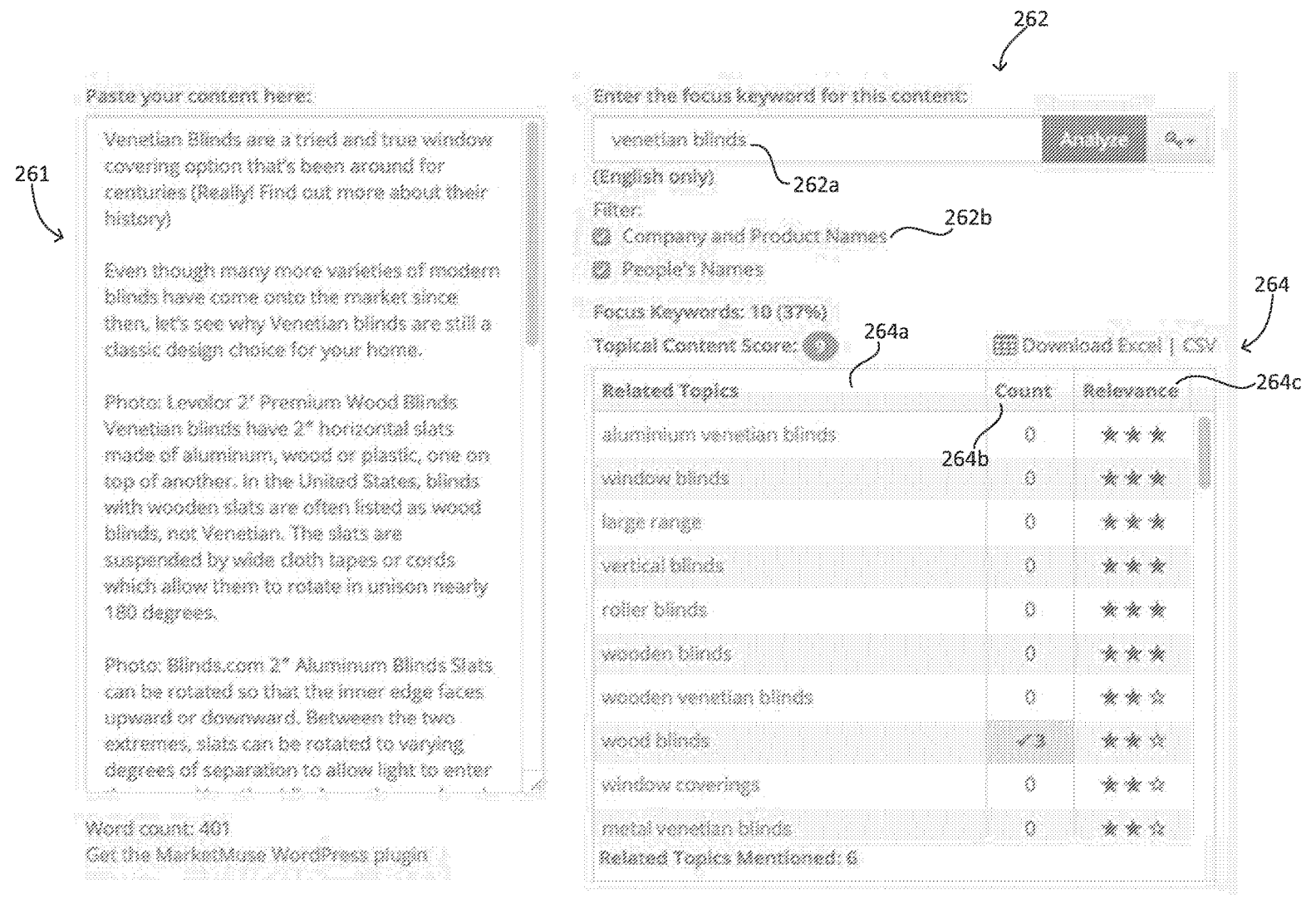

Referring to FIG. 2G, an embodiment of a content audit analyzer user interface 260 corresponding to the content audit tool 202*b* is depicted. According to the present embodiment, the content audit analyzer UI 260 is similar to the content audit UI 250, with some differences which will be discussed below. In some embodiments, instead of requesting a web address, the UI 260 includes a content input field 261 for a user to directly enter content to be analyzed by the content audit tool 202*b*. In some embodiments, the content to be entered are excerpts or full content to be posted on a webpage, or content that already exists on a webpage. The UI 260 may further include a focus keyword field 262 for entering a focus keyword 262*a*. In some embodiments, the focus keyword field 262 may be similar to the keyword field 211, and may further include one or more filters 262*b*. Accordingly, whereas the embodiment illustrated in FIG. 2F is configured to return more robust results corresponding to multiple pages of a web address, the embodiment of FIG. 2G may be focused on analysis of particular content entered into the UI 260. Accordingly, once a user enters the content to be analyzed in field 261 and the focus keyword 262*a*, the content audit tool 202*b* may analyze the content in a similar manner as that described above in connection with FIG. 2F to determine a content score of the content in field 261.

As such, in some embodiments, the results of the analysis performed by the content audit tool 202*b* may be organized and displayed at topic table 264 including a related topics column 264*a*, a count column 264*b*, and a relevance score column 264*c*. In the present embodiment, a plurality of topics related to the focus keyword 262*a* are listed under column 264*a*. Under column 264*b*, a number of occurrences corresponding to a given related topic is associated with each listed topic, and, under column 264*c*, a corresponding relevance score is also listed. In further embodiments, the UI 260 may display the content score of the content (e.g., based on the overall count score of the content and the corresponding relevance score of the topics mentioned in the content. According to the present embodiment, a user may quickly determine how related content is to a desired focus keyword, and may identify topics that may be added to the content for increasing the relevance of the content to the focus keyword, for example, to increase organic traffic to the content (e.g., SEO).

G. Topic Inventory Tool

Figure 2H:
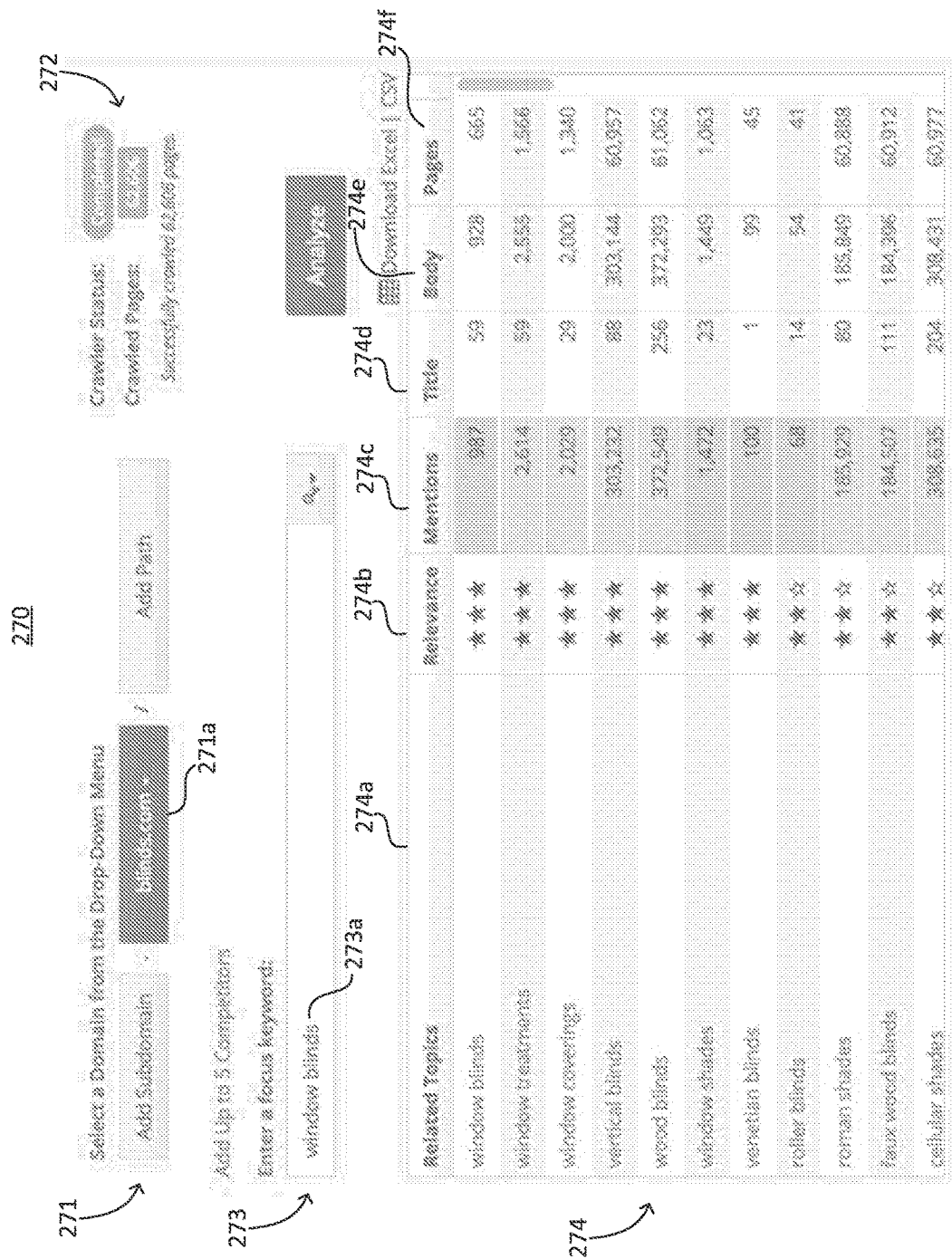
FIG. 2H is an embodiment of a screen shot of a topic inventory tool page.

Referring to FIG. 2H, an embodiment of a topic inventory user interface 270 corresponding to the topic inventory tool 202*c* is depicted. According to the present embodiment, the topic inventory UI 270 includes a domain or subdomain input field 271 for entering a web address 271*a*. The web address 271*a* may correspond to a website or webpage for which a user wishes to perform the topic inventory operation. In addition, the UI 270 includes a crawler status field 272, which may be similar to the crawler status field 227 and may further identify a number of pages crawled by the crawler 202e after completion of the crawling function. The UI 270 may further include a focus keyword field 273 for entering a focus keyword 273a. In some embodiments, the focus keyword field 273 may be similar to the keyword field 211.

According to some embodiments, the topic inventory tool 202c may be configured to identify and analyze the topics in the content of the website at address 271a. In the embodiment illustrated in FIG. 2H, the topic inventory tool 202c may be configured to perform a targeted analysis with respect to the entered focus keyword 273a and the content of the entered web address 271a. In such embodiments, the topic inventory tool 202c may limit its analysis to the pages corresponding to the web address 271a that mention the focus keyword 273a at least once. Accordingly, the topic inventory tool 202c may perform topic modeling in accordance with the ensemble of algorithms 202d, and run the topic modeling to the filtered list of pages and return relevance scores and other corresponding statistics.

As such, in some embodiments, the results of the analysis performed by the topic inventory tool 202c may be organized and displayed at topic table 274 including a related topics column 274a, a relevance score column 264b, a mentions column 274c, a title column 274d, a body column 274e, and a pages column 274f. In the present embodiment, a plurality of topics related to the focus keyword 273a are listed under column 274a. Under column 274b, a relevance score corresponding to an associated topic is listed, and under column 274c, a number of mentions corresponding to the corresponding related topic is listed. In some embodiments, the values under title column 274d may indicate the number of mentions of the corresponding topic in titles of the pages of the website at web address 271a. Similarly, the values under body column 274e may indicate the number of mentions of the corresponding topic in the bodies of the pages of the website at web address 271a. Furthermore, the values under pages column 274f may indicate the number of page of the website at web address 271a the corresponding topic is mentioned. In further embodiments, other statistics may be included as columns of the topic table 274, such as, but not limited to, the popularity of the corresponding topic and the like. According to the present embodiment, a user may quickly be able to identify related topics to a desired focus keyword, and may identify how prevalent each of the related topics are at a website, for example, to identify topics that should be expanded on to increase organic traffic to the content (e.g., SEO).

Figure 2I:
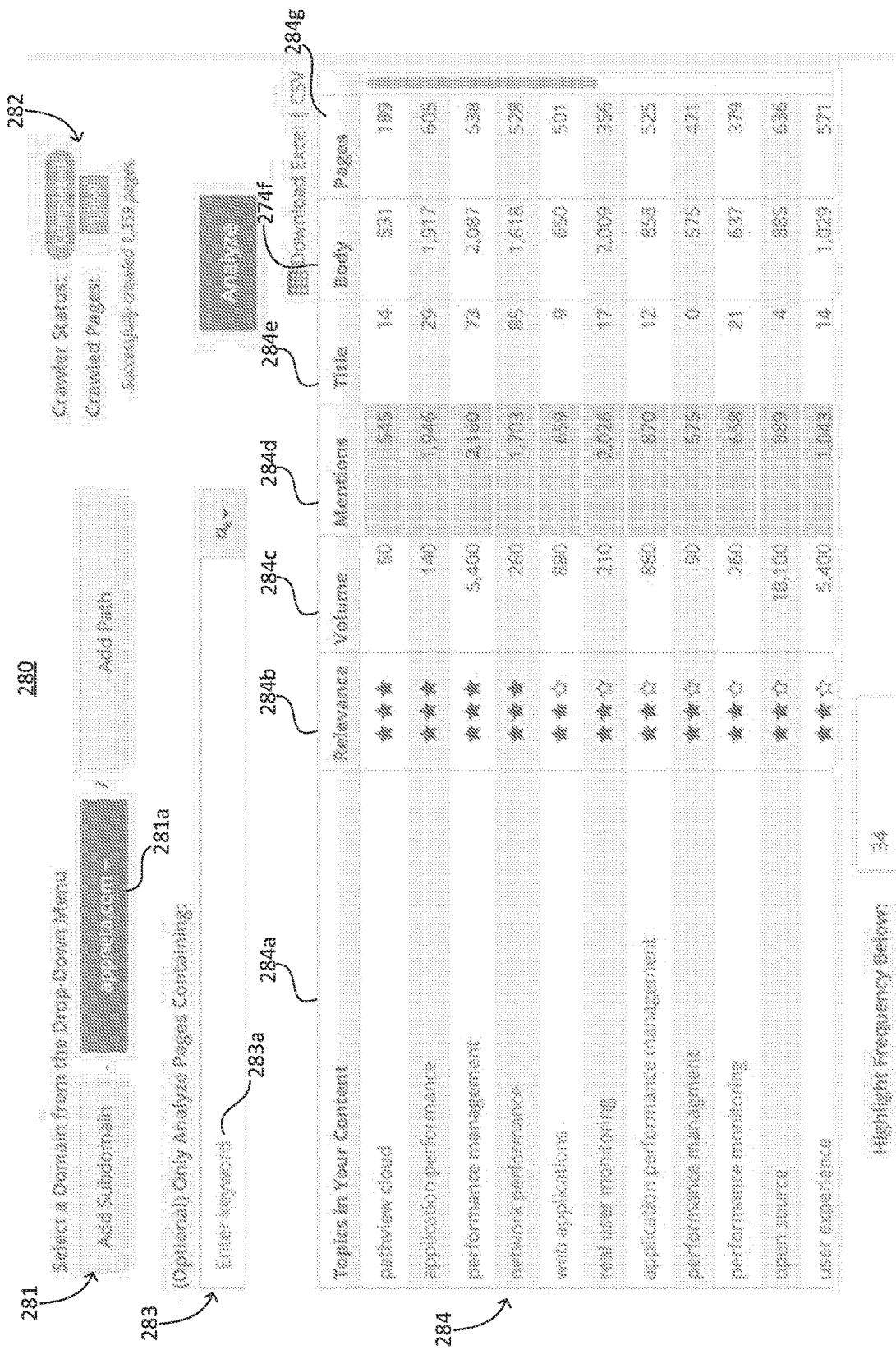
FIG. 2I is another embodiment of a screen shot of a topic inventory tool page.

Referring to FIG. 2I, another embodiment of a topic inventory user interface 280 corresponding to the topic inventory tool 202c is depicted. According to the present embodiment, the topic inventory UI 280 is similar to the topic inventory UI 270. However, in the present embodiment, a focus keyword field 283 is left blank and may be an optional entry. Accordingly, in the present embodiment, instead of a targeted analysis based on a user-entered focus keyword, the topic inventory tool 202c may perform an automatic or unsupervised analysis of all the pages of the website at the entered web address 281a. According to such embodiments, the topic inventory tool 202c may identify which topics are most relevant across all of the website's content, and may returns a list of relevant topics, including relevance scores that measure the degree of relevance, and other statistics, such as, but not limited to, page count frequencies. In some embodiments, such an analysis may be performed by the topic inventory tool 202c which may utilize the crawler 202e to crawl the pages of the website and may receive the acquired content from the crawler, and may utilize the ensemble of algorithms 202d for topic modeling to identify and rank by relevance the various topics of the website. In some embodiments, the topic inventory tool 202c may perform the topic modeling of the website. In other embodiments, the topic tool 202a may perform the topic modeling.

As such, in some embodiments, the results of the analysis performed by the topic inventory tool 202c may be organized and displayed at topic table 284, which may be similar to topic table 274. In some embodiments, the topic table 284 includes a related topics column 284a, a relevance score column 284b, a volume score column 284c, a mentions column 284d, a title column 284e, a body column 284f, and a pages column 284g. In the present embodiment, a plurality of topics extracted from the website at web address 281a are listed under column 284a. Furthermore, in columns 284b-284g, statistics and characteristics corresponding to the topics are listed. In some embodiments, the topic table 284 may include a highlight threshold field 285. The highlight threshold field 285 may allow a user to highlight certain topics that occur below a user-entered threshold (e.g., any topic that is mentioned less than 34 times). Accordingly, the topic inventory UI 280 can immediately alert a user to those topics that may require attention. According to the present embodiment, a user may quickly be able to identify prominent topics of a given website, and may discern how prevalent each of the topics are at the website, for example, to identify topics that should be expanded on to increase organic traffic to the website (e.g., SEO).

Figure 3A:
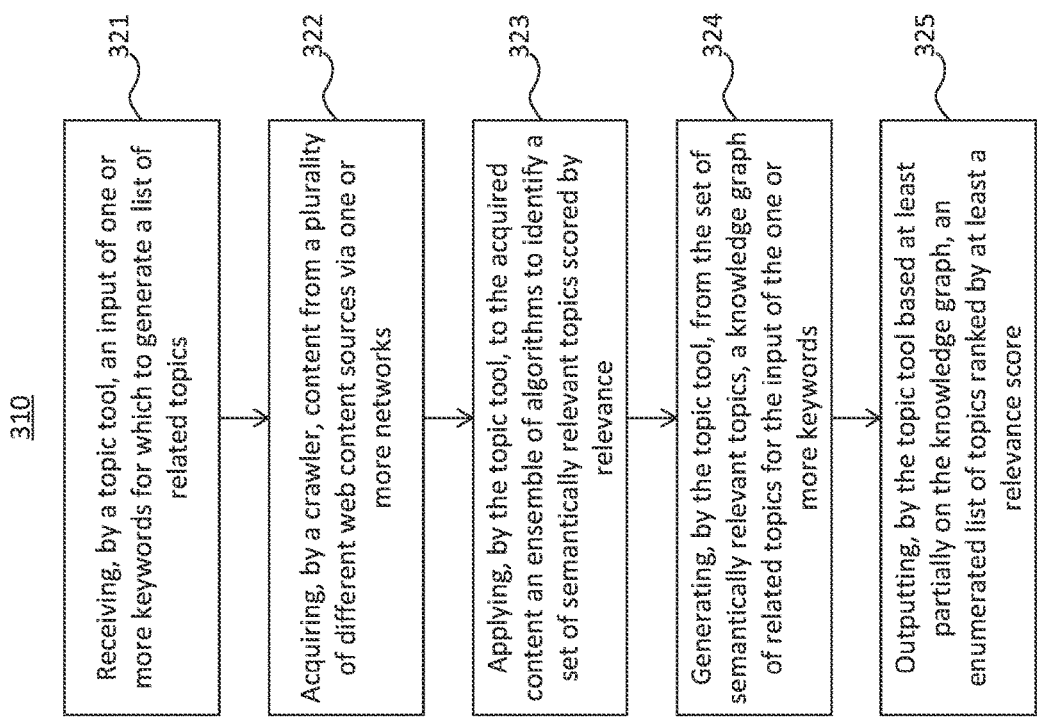
FIG. 3A is a flow diagram depicting an embodiment of a method of using a topic tool.

Referring to FIG. 3A, a method 310 for generating from one or more keywords a list of related topics for organic search is depicted. At step 311, the method 310 includes receiving, by a topic tool, an input of one or more keywords for which to generate a list of related topics. At step 312, the method 310 includes acquiring, by a crawler, content from a plurality of different web content sources via one or more networks. At step 313, the method 310 includes applying, by the topic tool, to the acquired content an ensemble of algorithms to identify a set of semantically relevant topics scored by relevance. At step 314, the method 310 includes generating, by the topic tool, from the set of semantically relevant topics, a knowledge graph of related topics for the input of the one or more keywords. At step 314, the method 310 includes outputting, by the topic tool based at least partially on the knowledge graph, an enumerated list of topics ranked by at least a relevance score.

In some embodiments, step 311 may be performed by the topic tool 202a. In such embodiments, the topic tool 202a may receive the one or more keywords for which to generate the list of related topics from a user interface at a client 102 and via the network 104. For example, the user interface may correspond to UI 210 or any other UI identified above. The one or more keywords may be various words or phrases that a user wishes to acquire related topics for. For example, keywords such as keyword 212 may be entered into the UI.

In some embodiments, step 312 may be performed by the crawler 202c. In such embodiments, the crawler 202c may be configured to acquire content from various sources, such as, but not limited to, websites, blogs, articles, and/or the like. For example, the step of acquiring content by the crawler 202e may correspond to block 224.

In some embodiments, step 313 may be performed by the topic tool 202a, which may receive the content acquired from the crawler 202e. In further embodiments, the topic tool 202a may access and work in conjunction with the ensemble algorithm 202*d* in applying the algorithms to the acquired content. In particular embodiments, the ensemble of algorithms 202*d* may include one or more key phrase extraction algorithms, one or more graph analyses algorithms, and one or more natural language processing algorithms.

In some embodiments, step 314 may be performed by the topic tool 202*a* after the topic tool 202*a* identifies the set of semantically relevant topics scored by relevance from the content acquired by the crawler 202*e*. The knowledge graph may correspond to the knowledge graph 229 depicted in block 226. In other embodiments, the generation of the knowledge graph is an optional step and may be skipped.

In some embodiments, step 315 may be performed by the topic tool 202*a*. In particular embodiments, the topic tool 202*a* may output the list of topics ranked by the relevance scores to the client 102 via the network 104. As such, the list of topics may be displayed at the UI at the client 102. In particular embodiments, the list of topics may take the form of the topic table 213 or any other table identified above. The list of topics may further include a relevance score associated with each topic, and the list of topics may be organized from a highest relevance score to a lowest relevance score.

Figure 3B:
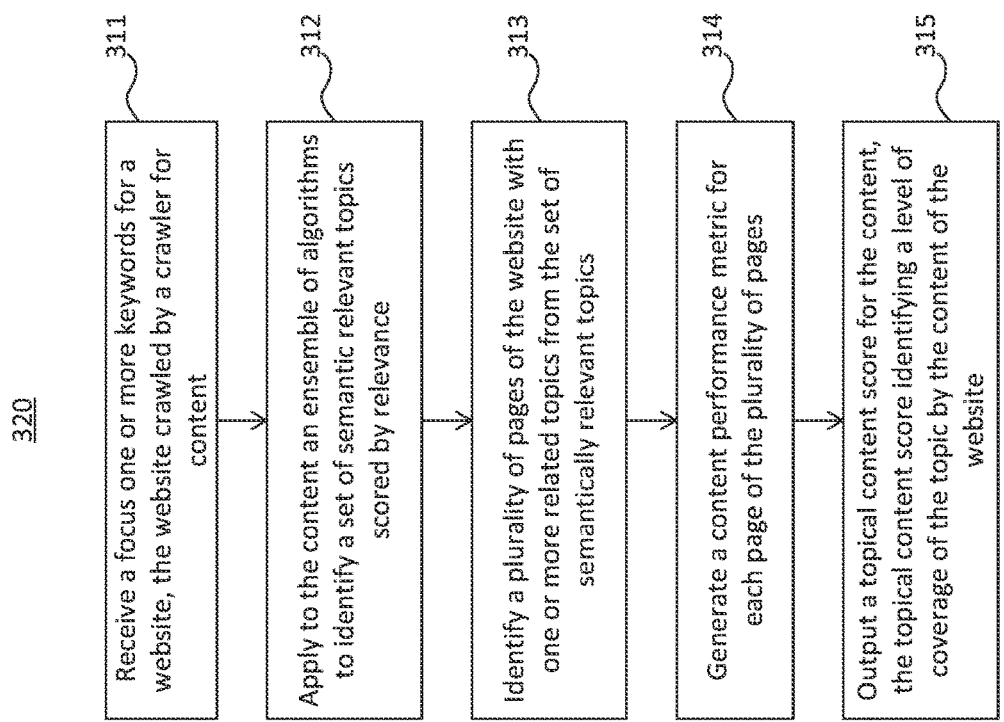
FIG. 3B is a flow diagram depicting an embodiment of a method of using a content audit tool.

Referring to FIG. 3B, a method 320 for auditing content for topic relevance is depicted. At step 321, the method 320 includes receiving a focus one or more keywords for a website, the website crawled by a crawler for content. At step 322, the method 320 includes applying to the content an ensemble of algorithms to identify a set of semantic relevant topics scored by relevance. At step 323, the method 320 includes identifying a plurality of pages of the website with one or more related topics from the set of semantically relevant topics. At step 324, the method 320 includes generating a content performance metric for each page of the plurality of pages. At step 325, the method 320 includes outputting a topical content score for the content, the topical content score identifying a level of coverage of the topic by the content of the website.

In some embodiments, step 321 may be performed by the content audit tool 202*b*. In such embodiments, the content audit tool 202*b* may receive the focus one or more keywords from a user interface at a client 102 and via the network 104. For example, the user interface may correspond to UI 250 or any other UI identified above. The focus one or more keywords may be various words or phrases that a user wishes to analyze the provided website for. For example, keywords such as keyword 253*a* may be entered into the UI. In further embodiments, the crawler 202*e* receives the website address from the UI via the network 104.

In some embodiments, step 322 may be performed by the content audit tool 202*b*, which may receive the content acquired from the crawler 202*e*. In further embodiments, the content audit tool 202*b* may access and work in conjunction with the ensemble of algorithms 202*d* in applying the algorithms to the acquired content. In particular embodiments, the ensemble of algorithms 202*d* may include one or more key phrase extraction algorithms, one or more graph analyses algorithms, and one or more natural language processing algorithms.

In some embodiments, step 323 may be performed by the content audit tool 202*b*. The content audit tool 202*b* may receive the content acquired by the crawler 202*e* and parse the content to identify relevant pages of the website.

In some embodiments, step 324 may be performed by the content audit tool 202*b*. The content performance metric may be based on the frequency that relevant topics occur in the pages of the website.

In some embodiments, step 325 may be performed by the content audit tool 202*b*. In particular embodiments, the content audit tool 202*b* may output the topical content score to the client 102 via the network 104. As such, the topical content score may be displayed at the UI at the client 102. In particular embodiments, the content score may take the form of the table 254 or 261. In some embodiments, content scores are associated with corresponding pages of the website (FIG. 2F). In other embodiments, the content score is associated with user-entered content (FIG. 2G).

While the invention has been particularly shown and described with reference to specific embodiments, it should be understood by those skilled in the art that various changes in form and detail may be made therein without departing from the spirit and scope of the invention described in this disclosure.

What is claimed is:

1. A system for generating from one or more keywords a list of related topics for organic search, the system comprising:
   a client computing device configured to:
   send via a computer network connection, to a server, a request for keywords related to a topic or concept,
   wherein, the server to which the request is sent utilizes:
      a crawler configured to acquire content from a plurality of different web content sources via one or more computer network connections; and
      a topic tool configured to execute on a processor on at least one server to:
         receive an input including the request for keywords related to a topic or concept for which to generate a list of related topics;
         apply to the acquired content an ensemble of algorithms, the ensemble comprising a predetermined sequence of:
            one or more key phrase extraction algorithms to generate a set of keywords based on at least the acquired content,
            one or more graph analyses algorithms to identify a set of topics semantically relevant to the set of keywords generated using the one or more key phrase extraction algorithms, and
            one or more natural language processing algorithms to determine a relevance score for each topic of the set of semantically relevant topics;
         generate from the set of semantically relevant topics, a knowledge graph of related topics for the input of the one or more keywords; and
      receive via the computer network connection, from the server, output based at least partially on the knowledge graph, an enumerated list of topics ranked by at least the relevance score.

2. The system of claim 1, wherein the server to which the request is sent further comprises a topic inventory tool configured to generate the input of one or more keywords from analyses of content from an identified web site.

3. The system of claim 1, wherein the key phrase extraction algorithms comprise a Bayesian statistical ensemble.

4. The system of claim 1, wherein the ensemble is further configured to perform a plurality of term ranking functions including one or more of the following: a core phrase term ranking function, a tail phrase term ranking function, a hyperdictionary graph traversal algorithm and a semantic knowledgebase path traversal score.

5. A method for generating from one or more keywords a list of related topics for organic search, the method comprising:

sending with a client device, via a computer network connection, to a server, a request for keywords related to a topic or concept,
wherein, the server to which the request is sent utilizes:
a crawler configured to acquire content from a plurality of different web content sources via one or more computer network connections; and
a topic tool configured to execute on a processor on at least one server to:
receive an input including the request for keywords related to a topic or concept for which to generate a list of related topics;
apply to the acquired content an ensemble of algorithms, the ensemble comprising a predetermined sequence of:
one or more key phrase extraction algorithms to generate a set of keywords based on at least the acquired content,
one or more graph analyses algorithms to identify a set of topics semantically relevant to the set of keywords generated using the one or more key phrase extraction algorithms, and
one or more natural language processing algorithms to determine a relevance score for each topic of the set of semantically relevant topics;
generate from the set of semantically relevant topics, a knowledge graph of related topics for the input of the one or more keywords; and
receiving with the client device, via the computer network connection, from the server, output based at least partially on the knowledge graph, an enumerated list of topics ranked by at least the relevance score.

6. The method of claim 5, wherein the receiving an input further comprises receiving, by the topic tool, the input of one or more keywords from a topic inventory tool, the topic inventory tool generating the input keyword from analyses of content from an identified web site.

7. The method of claim 5, wherein the acquiring further comprises acquiring content, by the crawler, from the plurality of different web content sources comprising web sites, news articles, blog posts and keyword data.

8. The method of claim 5, wherein the acquiring further comprises cleansing and normalizing the acquired content.

9. The method of claim 5, wherein the one or more key phrase extraction algorithms comprise a Bayesian statistical ensemble.

10. The method of claim 5, wherein the applying further comprises performing a plurality of term ranking functions are performed including one or more of the following: a core phrase term ranking function, a tail phrase term ranking function, a hyperdictionary graph traversal algorithm and a semantic knowledgebase path traversal score.

11. The method of claim 5, wherein the applying further comprises applying a weight to each of the one or more algorithms of the ensemble to generate the relevance score for the set of semantic relevance scored phrases.

12. The method of claim 5, wherein the receiving output further comprises receiving the enumerated list of topics ranked by a measure of frequency comprising one or more of the following: frequency in page body, frequency in title, and number of pages where the topics occur.

13. The method of claim 5, wherein the receiving output further comprises receiving the enumerated list of topics ranked by at least one of an attractiveness score, a volume score and a competition score.

14. The method of claim 5, wherein the receiving output further comprises receiving the enumerated list of topics ranked by an estimated equivalent value associated with paid advertising.

15. The method of claim 5, wherein the receiving output further comprises receiving the enumerated list of topics ranked by one or more of the following:
a measure of frequency, an attractiveness score, a volume score, and a competition score.

16. A non-transitory computer-readable storage medium comprising:
instructions that, when executed by a device comprising a processor, facilitate performance of generating topics for organic search operations comprising:
receiving, via a computer network connection, a request for keywords related to a topic or concept,
implementing a crawler configured to acquire content from a plurality of different web content sources via one or more computer network connections; and
implementing a topic tool to:
receive an input including the request for keywords related to a topic or concept for which to generate a list of related topics;
apply to the acquired content an ensemble of algorithms, the ensemble comprising a predetermined sequence of:
one or more key phrase extraction algorithms to generate a set of keywords based on at least the acquired content,
one or more graph analyses algorithms to identify a set of topics semantically relevant to the set of keywords generated using the one or more key phrase extraction algorithms, and
one or more natural language processing algorithms to determine a relevance score for each topic of the set of semantically relevant topics;
generate from the set of semantically relevant topics, a knowledge graph of related topics for the input of the one or more keywords; and
outputting, based at least partially on the knowledge graph, an enumerated list of topics ranked by at least the relevance score.

17. The medium of claim 16, wherein the instructions for receiving an input further comprise instructions for receiving, by the topic tool, the input of one or more keywords from a topic inventory tool, the topic inventory tool generating the input keyword from analyses of content from an identified web site.

18. The medium of claim 16, wherein the instructions for acquiring further comprise instructions for acquiring content, by the crawler, from the plurality of different web content sources comprising web sites, news articles, blog posts and keyword data.

19. The medium of claim 16, wherein the one or more key phrase extraction algorithms comprise a Bayesian statistical ensemble.

20. The medium of claim 16, wherein the instructions for applying further comprise instructions for performing a plurality of term ranking functions are performed including one or more of the following: a core phrase term ranking function, a tail phrase term ranking function, a hyperdictionary graph traversal algorithm and a semantic knowledgebase path traversal score.

* * * * *